United States Patent [19]
Wright et al.

[11] Patent Number: 5,551,433
[45] Date of Patent: Sep. 3, 1996

[54] METHOD AND APPARATUS FOR A GEOMETRIC ABERRATION TRANSFORM IN AN ADAPTIVE FOCUSING ULTRASOUND BEAMFORMER SYSTEM

[75] Inventors: J. Nelson Wright, Menlo Park; Gregory L. Holley; Donald R. Langdon, both of Mountain View, all of Calif.

[73] Assignee: Acuson Corporation, Mountain View, Calif.

[21] Appl. No.: 286,664

[22] Filed: Aug. 5, 1994

[51] Int. Cl.$^6$ .............................. A61B 8/00; G01N 29/00
[52] U.S. Cl. ................ 128/660.07; 128/661.01; 73/626
[58] Field of Search ............ 128/660.07, 661.01; 73/626

[56] References Cited

U.S. PATENT DOCUMENTS

| | | | |
|---|---|---|---|
| 4,471,785 | 9/1984 | Wilson et al. | 128/660 |
| 4,817,614 | 4/1989 | Hassler et al. | 128/660.05 |
| 4,835,689 | 5/1989 | O'Donnell | 364/413.25 |
| 4,852,577 | 8/1989 | Smith et al. | 128/660.07 |
| 4,937,775 | 6/1990 | Engeler et al. | 364/728.03 |
| 4,989,143 | 1/1991 | O'Donnell et al. | 364/413.25 |
| 5,111,823 | 5/1992 | Cohen | 128/660.07 |
| 5,113,866 | 5/1992 | Hassler et al. | 128/661.01 |
| 5,170,170 | 12/1992 | Soumekh | 128/660.07 |
| 5,172,343 | 12/1992 | O'Donnell | 367/7 |
| 5,184,623 | 2/1993 | Mallart | 128/661.01 |
| 5,203,336 | 4/1993 | Iida et al. | 128/660.07 |
| 5,235,983 | 8/1993 | Iida et al. | 128/660.07 |
| 5,251,631 | 10/1993 | Tsuchiko et al. | 128/661.01 |

(List continued on next page.)

FOREIGN PATENT DOCUMENTS 3926477  2/1991  Germany  ........... G03B 42/06

OTHER PUBLICATIONS

D. Liu & R. Waag, Correction of Ultrasonic Wavefront Distortion Using Backpropagation and a Reference Waveform Method for Time–Shift Compensation, J. Acoust. Soc. Am. 95(2), Pt. 1, pp. 649–660 (Aug. 1994).

Phase Aberration Correction in Medical Ultrasound Using Speckle Brightness as a Quality Factor, Levin Nock, Gregg E. Trahey and Stephen W. Smith, Journal of the Accoustical Society of America, vol. 85, No. 5, May 1989.

Adaptive Ultrasonic Array Imaging System Through an Inhomogenous Layer, Makoto Hirama, Osamu Ikeda and Takuso Sato, Journal of the Accoustical Society of America, vol. 71, Jan. 1982.

Active Incoherent Ultrasonic Imaging Through an Inhomogenous Layer, Takayoshi Yokota, Takuso Sato, and Makoto Hirama, Journal of the Accoustical Society of America, vol. 77, Jan. 1985.

Phase Aberration Correction Using Signals from Point Reflectors and Diffuse Scatterers, S. W. Flax and M. O'Donnell, IEEE Transactions on Ultrasonics, Ferroelectronics, and Frequency Control, vol. 35, Nov. 1988.

Correlation–Based Aberration Correction in the Presence of Inoperative Elements, Matthew O'Donnell and William E. Engeler, IEEE Transactions of Ultrasonics, Ferroelectrics, and Frequency Control, vol. 39, Nov. 1992.

Primary Examiner—Francis Jaworski
Attorney, Agent, or Firm—Willian Brinks Hofer Gilson & Lione

[57] ABSTRACT

A method and an apparatus are provided for storage and retrieval of measured aberration correction values used in adaptive focus ultrasound imaging. The aberration correction values, corresponding to an aberration region in an imaged subject, are measured at a transmit focal depth. The measured aberration correction values, typically delays, from a measurement depth are stored in a geometric aberration transform (GAT™) table and transformed to aberration correction values at other focal depths for correcting the focus of both transmit and receive beamformers. The transformation is accomplished by using a geometric aberration transform (GAT™) index table which retrieves one or more aberration correction values in the table for any desired depth.

95 Claims, 22 Drawing Sheets

U.S. PATENT DOCUMENTS

| | | | |
|---|---|---|---|
| 5,268,876 | 12/1993 | Rachlin | 128/661.01 |
| 5,331,963 | 7/1994 | Mallart | 128/661.01 |
| 5,331,964 | 7/1994 | Trahey et al. | 128/661.01 |
| 5,338,461 | 8/1994 | Rigby | 73/597 |
| 5,348,013 | 9/1994 | Kovda et al. | 128/660.07 |
| 5,357,797 | 10/1994 | Matsushima et al. | 128/661.01 |
| 5,357,962 | 10/1994 | Green | 128/660.07 |
| 5,383,457 | 1/1995 | Cohen | 128/660.07 |
| 5,415,173 | 5/1995 | Miwa et al. | 128/661.01 |
| 5,423,318 | 6/1995 | Li et al. | 128/661.01 |

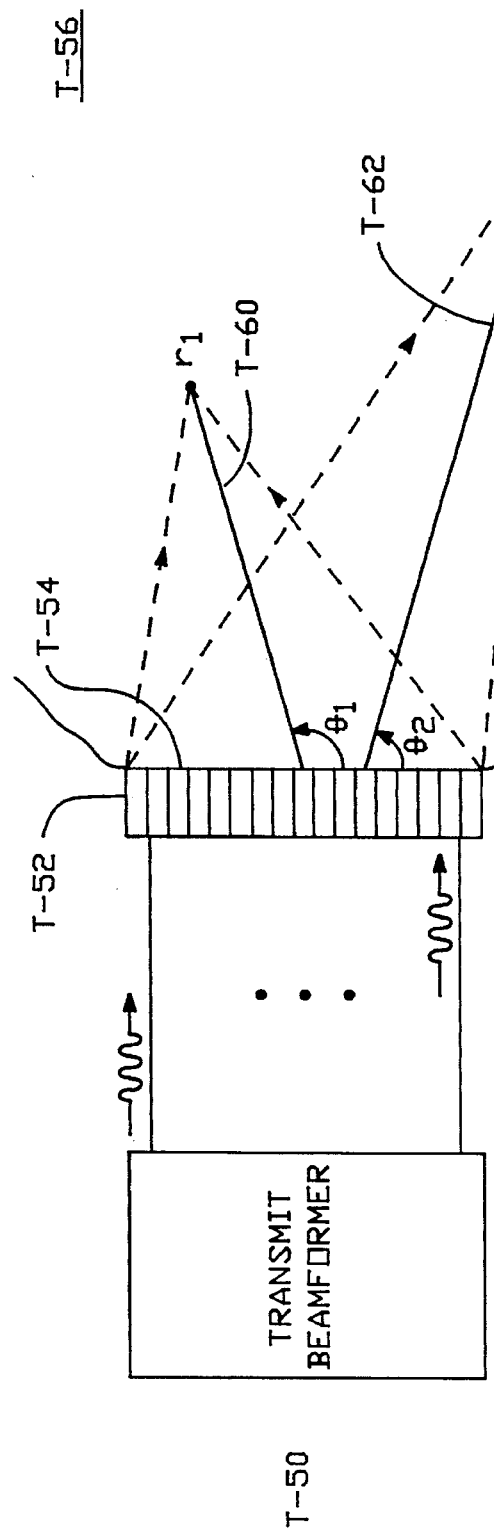
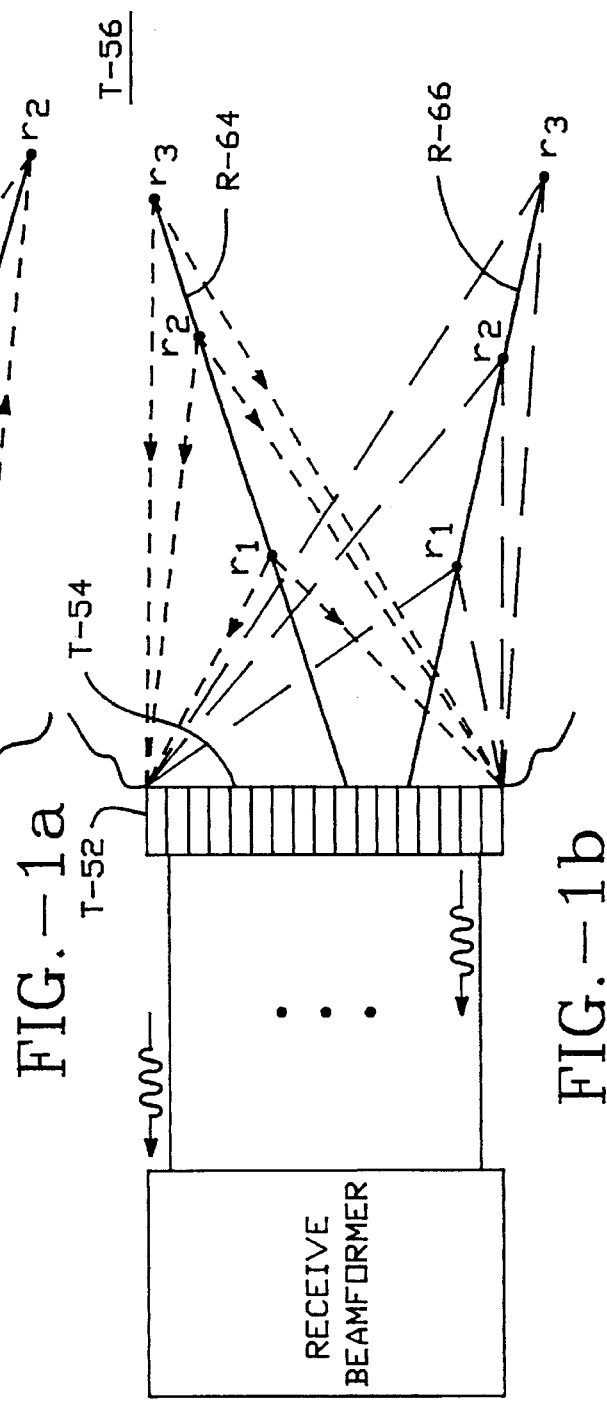
FIG.–1a
FIG.–1b

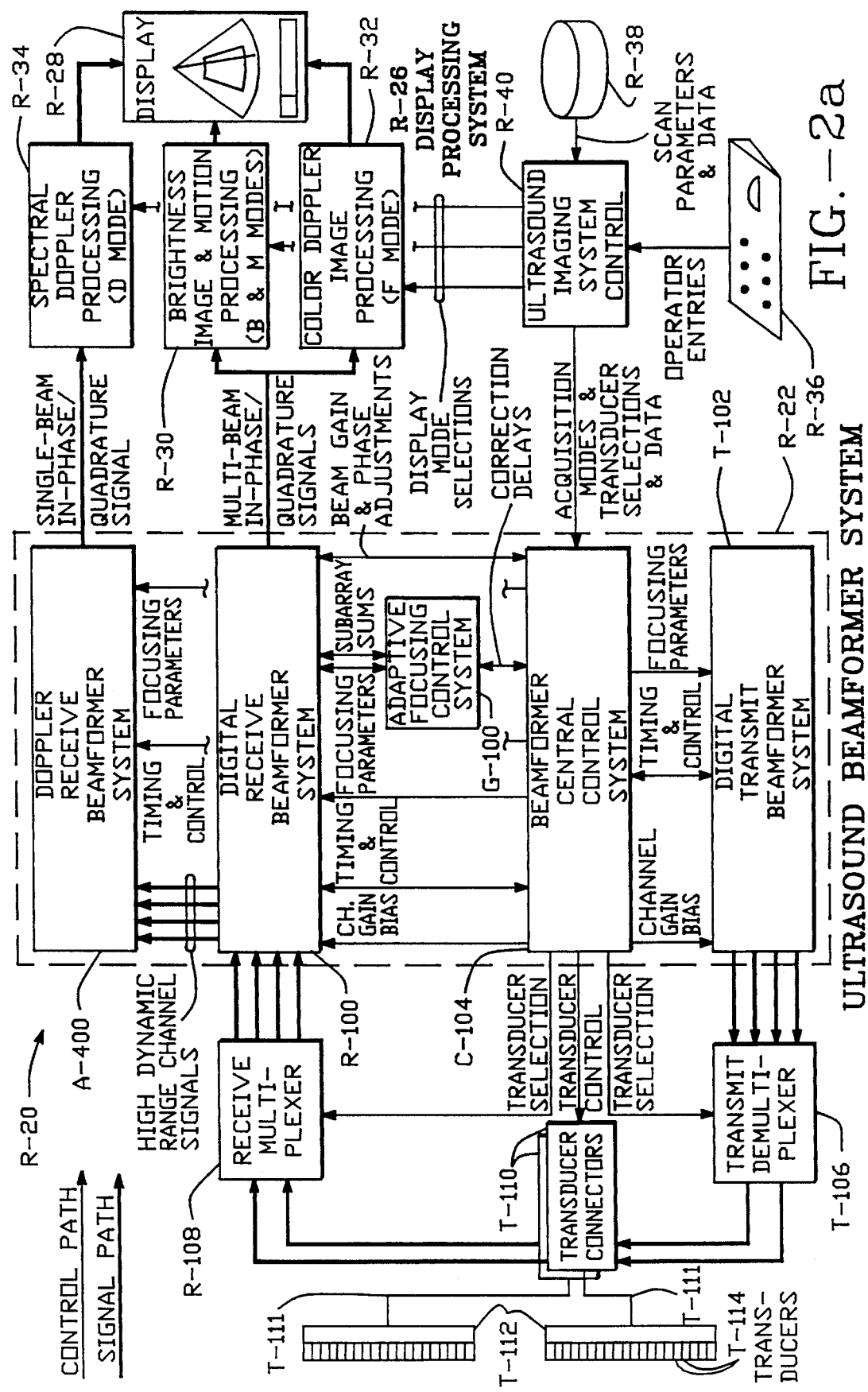
FIG.—2a

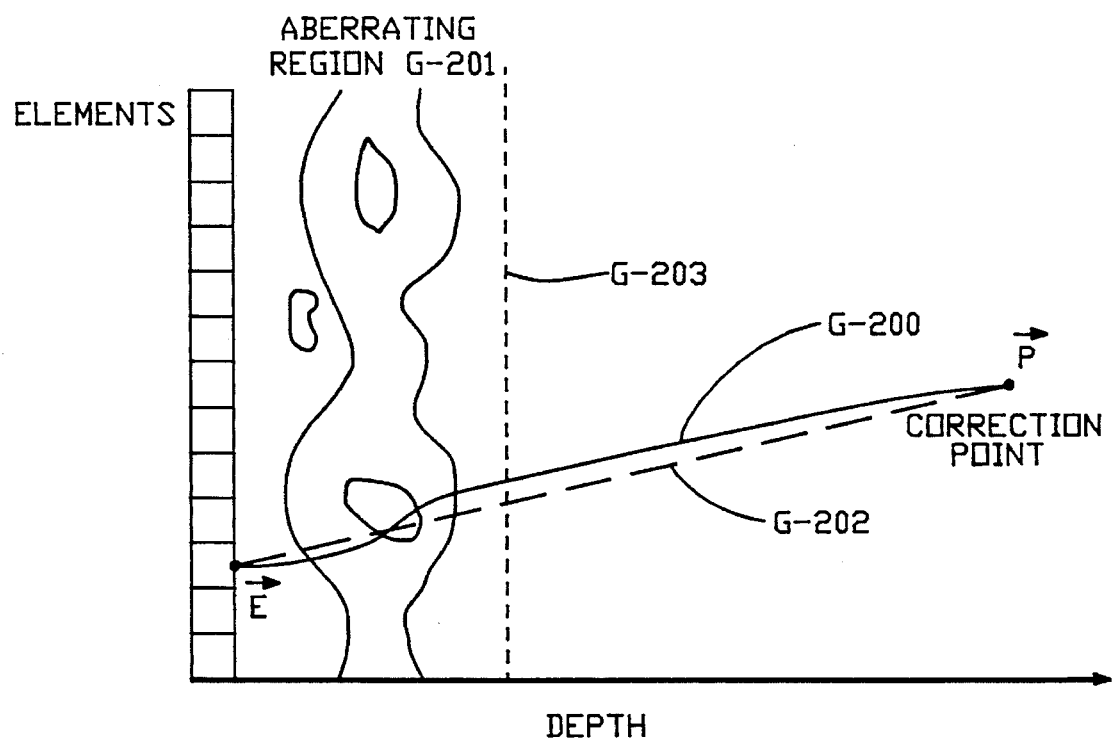
FIG.—4
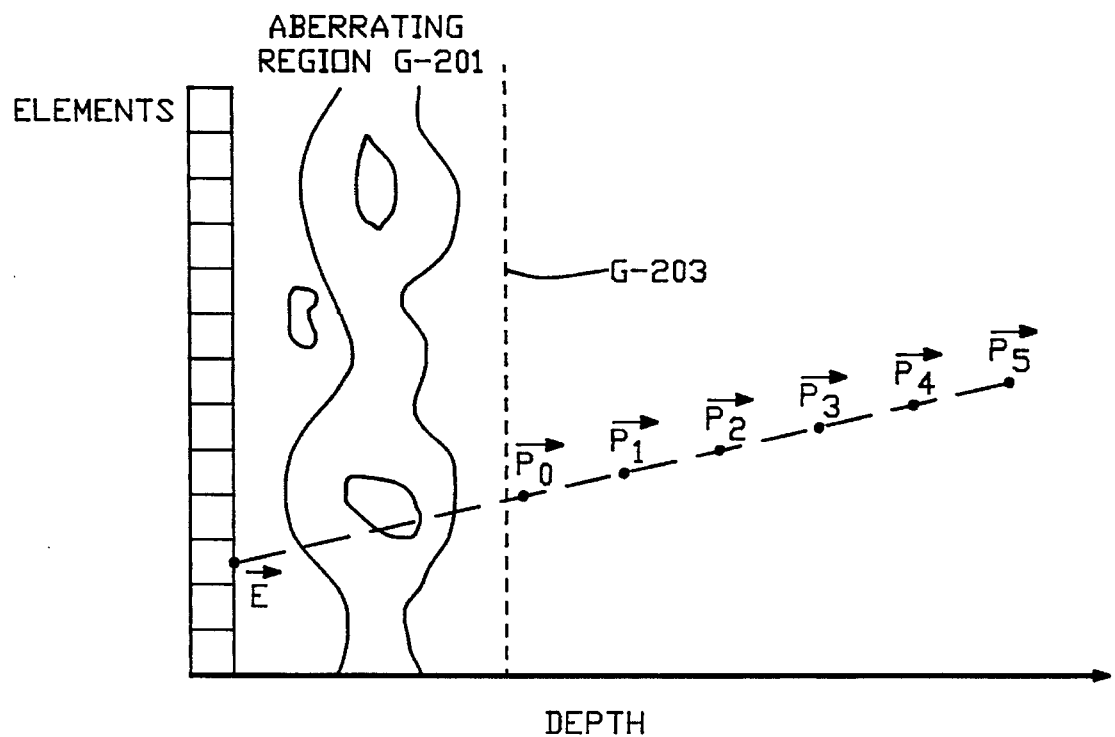
FIG.—5

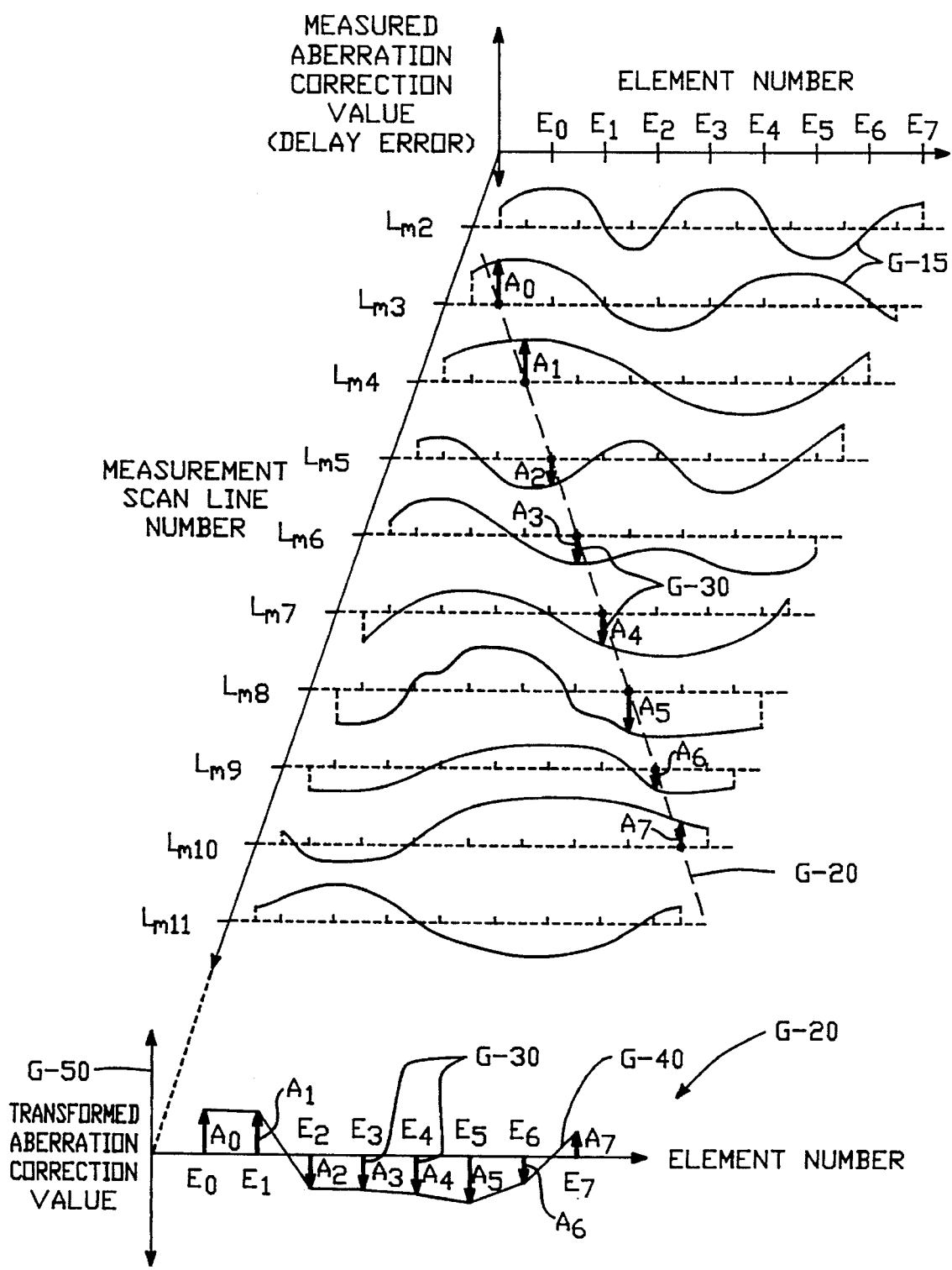
FIG.—6b

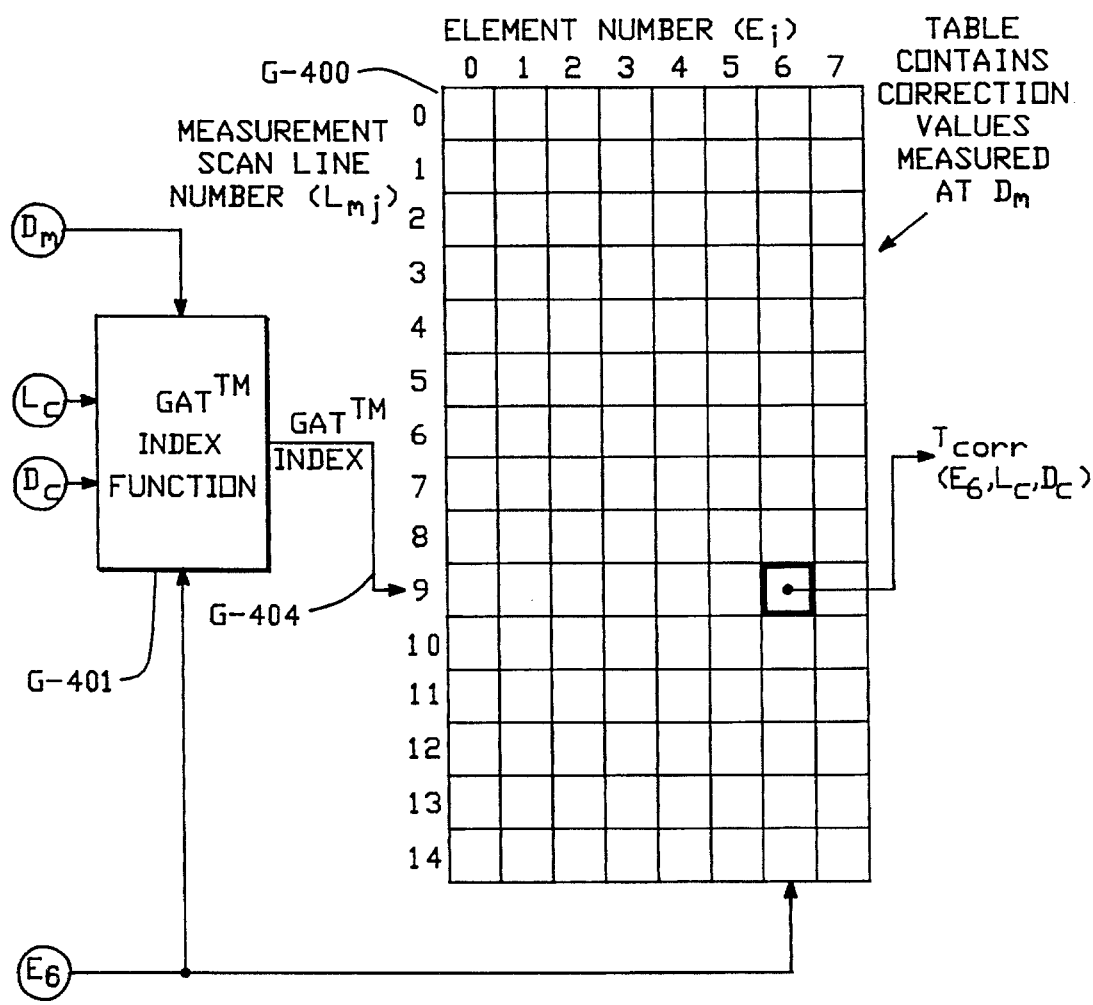
FIG.—6c

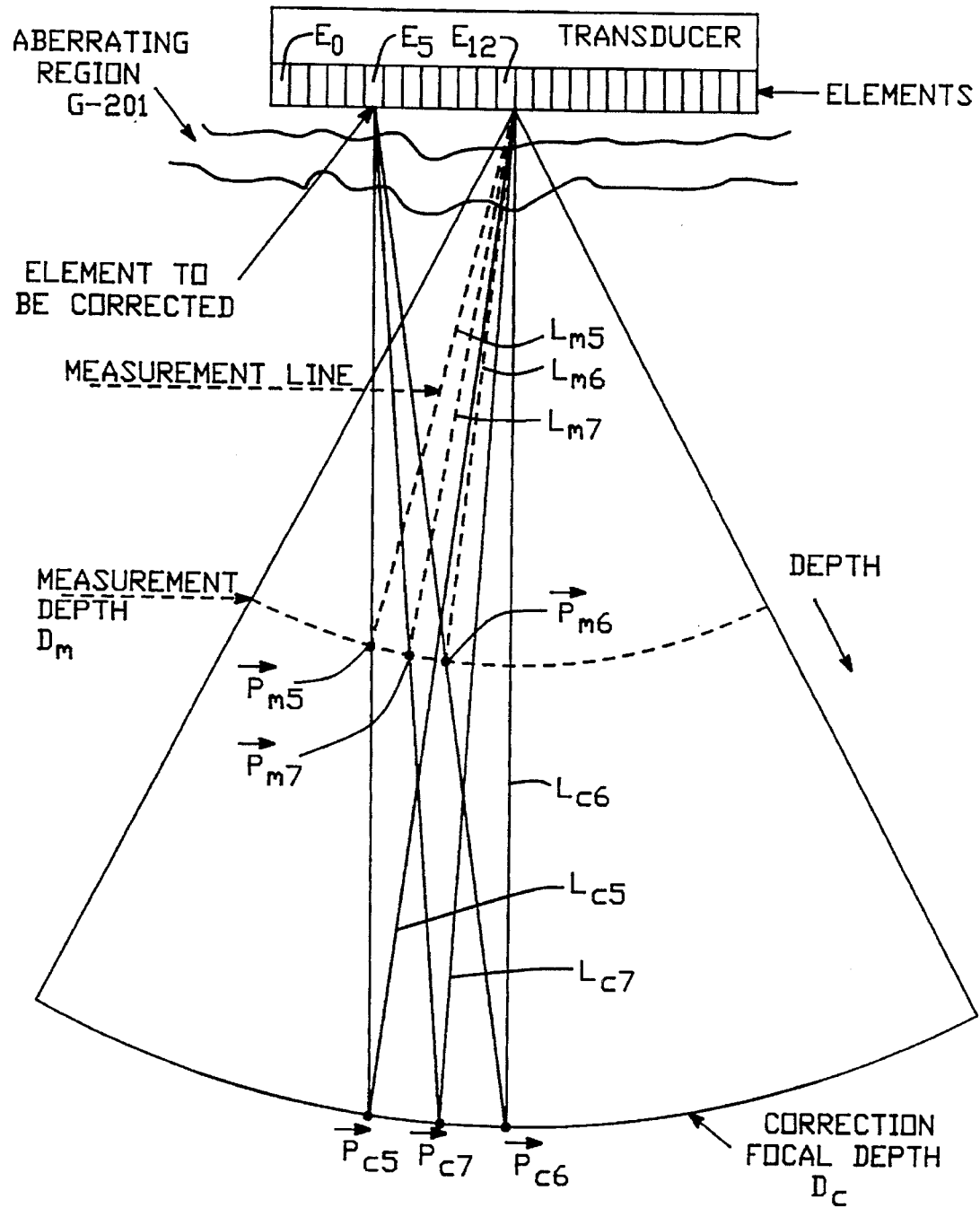
FIG.—7

FIG.−9

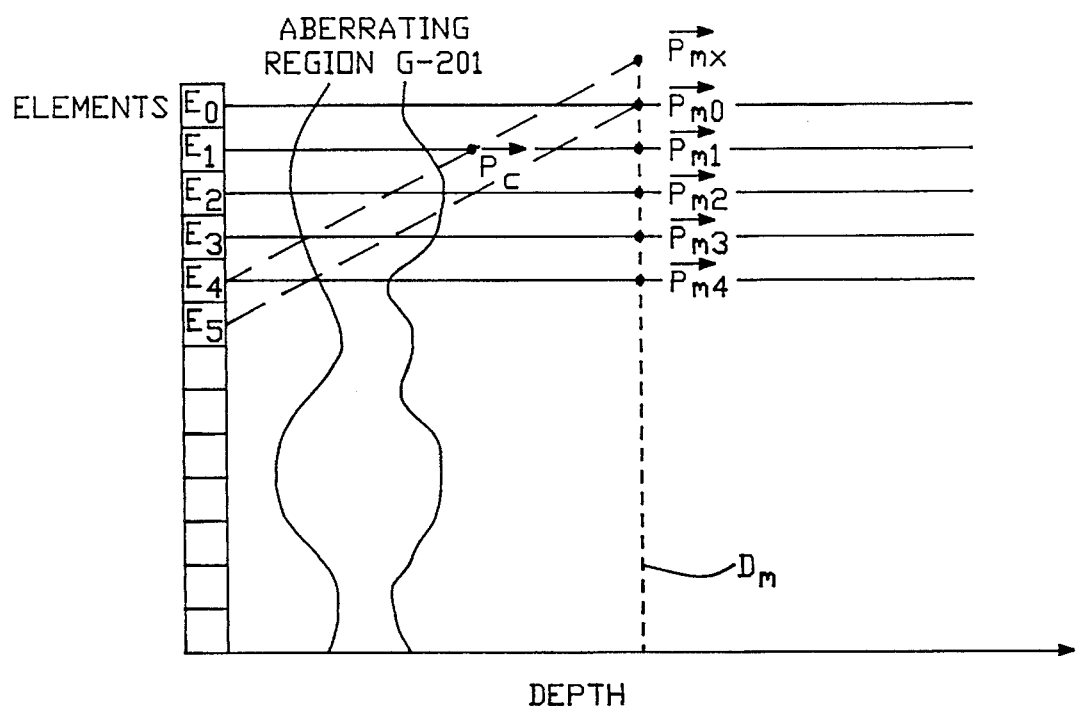
FIG.—14
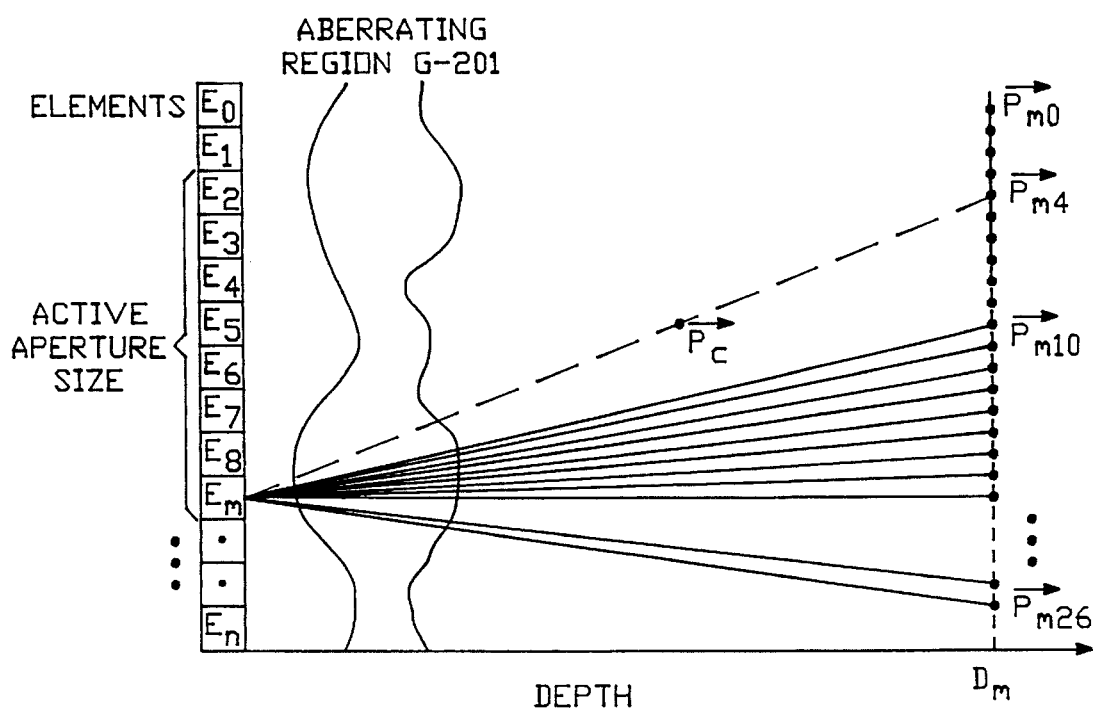
FIG.—15

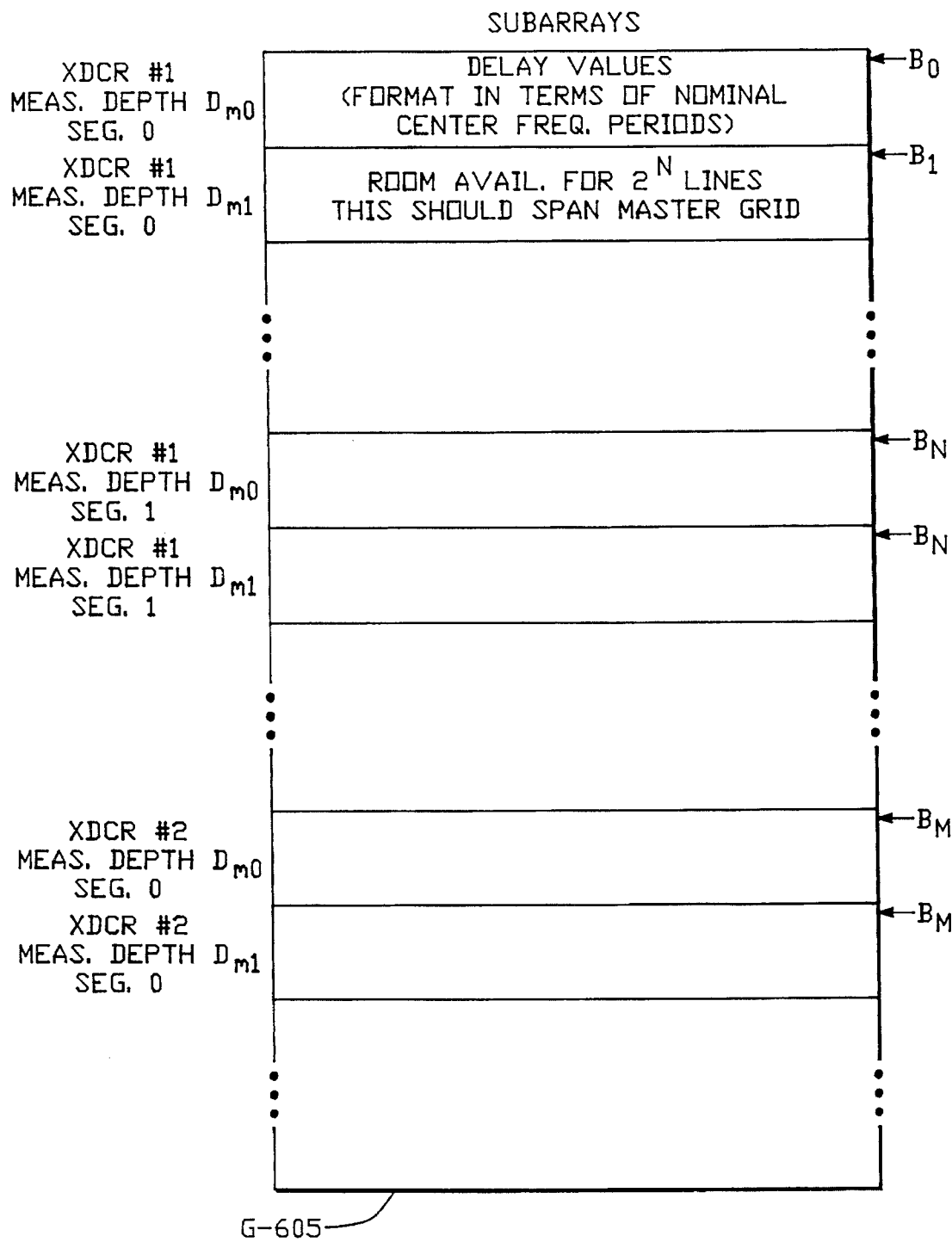
FIG.—21

METHOD AND APPARATUS FOR A GEOMETRIC ABERRATION TRANSFORM IN AN ADAPTIVE FOCUSING ULTRASOUND BEAMFORMER SYSTEM

CROSS-REFERENCE TO RELATED APPLICATIONS

This Application is related to the following application all filed on Aug. 5, 1994:

| Title | Inventors | Atty. Docket No. | Ser. No. |
| --- | --- | --- | --- |
| METHOD AND APPARATUS FOR RECEIVE BEAMFORMER SYSTEM | J. Nelson Wright Christopher R. Cole Albert Gee | ACUS-1000 SRM | 08/286,658 |
| METHOD AND APPARATUS FOR TRANSMIT BEAMFORMER SYSTEM | Christopher R. Cole Albert Gee Thomas Liu | ACUS-1001 SRM/WSW | 08/286,652 |
| METHOD AND APPARATUS FOR FOCUS CONTROL OF TRANSMIT AND RECEIVE BEAMFORMER SYSTEMS | Albert Gee Christopher R. Cole J. Nelson Wright | ACUS-1002 SRM | 08/286,268 |
| METHOD AND APPARATUS FOR DOPPLER RECEIVE BEAMFORMER SYSTEM | Samuel H. Maslak Christopher R. Cole Joseph G. Petrofsky | ACUS-1003 SRM/WSW | 08/286,648 |
| METHOD AND APPARATUS FOR REAL-TIME, CONCURRENT ADAPTIVE FOCUSING IN AN ULTRASOUND BEAMFORMER IMAGING SYSTEM | J. Nelson Wright Samuel H. Maslak Donald R. Langdon Gregory L. Holley Christopher R. Cole | ACUS-1004 SRM/KJD | 08/286,528 |
| METHOD AND APPARATUS FOR COHERENT IMAGE FORMATION | J. Nelson Wright Samuel H. Maslak David J. Finger Albert Gee | ACUS-1006 SRM | 08/286,510 |
| METHOD AND APPARATUS FOR ADJUSTABLE FREQUENCY SCANNING IN ULTRASOUND IMAGING | J. Nelson Wright Christopher R. Cole Albert Gee Hugh G. Larsen Samuel H. Maslak | ACUS-1022 SRM/WSW | 08/286,524 |

The related patent applications are all commonly assigned with the present application, filed concurrently with the present application, and are all incorporated herein by reference in their entirety.

FIELD OF THE INVENTION

The present invention relates to ultrasound imaging and, in particular, to adaptive focusing ultrasound imaging systems which provide aberration correction values for distorted ultrasound beams caused by an aberrating region.

BACKGROUND OF THE INVENTION

A. Description of the Related Art

Ultrasound imaging systems use time delays and/or phase rotation means to form focused ultrasound beams. On transmit, time delays and/or phase rotation means are used to bring ultrasound pulses from different transducer elements to the desired focal point with temporal alignment and phase coherence. Likewise, on receive, time delays and/or phase rotation means are used to bring reflected ultrasound pulses arriving at different transducer elements from the desired focal points into temporal alignment and phase coherence. The time delays and phases used to focus the ultrasound beam are specified assuming a constant propagation velocity (nominally 1540 m/s in human soft tissue) in the medium through which ultrasound pulses propagate.

However, human soft tissue is not homogenous; it is composed of regions of acoustically differing tissues, such as fat, muscle and blood, in which the local propagation velocity varies. The path dependent speed of sound in tissue distorts the transmitted and reflected wavefronts propagating through the tissues by introducing delay variations from the nominal. These delay variations degrade the quality of focus, thus reducing the spatial resolution and contrast resolution seen in the image.

B. Patents and Literature

By way of example, the following United States patents and literature, all of which are incorporated by reference herein, discuss various aspects of ultrasound imaging. The patents and literature include:

| U.S. Pat. No.: | Title: | Inventor(s): |
| --- | --- | --- |
| 4,471,785 | ULTRASONIC IMAGING SYSTEM WITH CORRECTION FOR VELOCITY IN- HOMOGENEITY AND MULTIPATH INTER- FERENCE USING AN ULTRASONIC IMAGING ARRAY | David A. Wilson James L. Buxton Philip S. Green Donald J. Burch John Holzener S. David Ramsey, Jr. |
| 4,817,614 | METHOD AND APPARATUS FOR ADAPTIVE FOCUSING IN A MEDICAL ULTRASOUND IMAGING APPARATUS | Dietrich Hassler Heinz Eschenbacher Wolfgang Haerer |
| 4,835,689 | ADAPTIVE COHERENT ENERGY BEAM FORMATION USING PHASE CONJUGATION | Matthew O'Donnell |
| 4,852,577 | HIGH SPEED ADAPTIVE ULTRASONIC PHASED ARRAY IMAGING | Stephen W. Smith Gregg E. Trahey |

-continued

| U.S. Pat. No.: | Title: | Inventor(s): |
|---|---|---|
| | SYSTEM | |
| 4,937,775 | APPARATUS FOR THE THE CROSS-CORRELATION OF A PAIR OF COMPLEX SAMPLED SIGNALS | William E. Engeler Matthew O'Donnell |
| 4,989,143 | ADAPTIVE COHERENT ENERGY BEAM FORMATION USING ITERATIVE PHASE CONJUGATION | Matthew O'Donnell Stephen W. Flax |
| 5,113,866 | METHOD FOR ULTRASOUND IMAGING | Dietrich Hassler Klaus Killig |
| 5,172,343 | ABERRATION CORRECTION USING BEAM DATA FROM A PHASED ARRAY ULTRASONIC SCANNER | Matthew O'Donnell |

2. Literature a. M. Hirama, et al., "Adaptive Ultrasonic Array Imaging System Through an Inhomogeneous Layer," Journal of the Acoustical Society of America, Vol. 71, pp. 100–109, January 1982.

b. T. Yokota, et al., "Active Incoherent Ultrasonic Imaging Through an Inhomogeneous Layer," Journal of the Acoustical Society of America, Vol. 77, pp. 144–152, January 1985.

c. S. Flax, et al., "Phase Aberration Correction Using Signals From Point Reflectors and Diffuse Scatterers," IEEE Transactions on Ultrasonics, Ferroelectrics, and Frequency Control, Vol. 35, pp. 758–774, November 1988.

d. L. Nock, et al., "Phase Aberration Correction In Medical Ultrasound Using Speckle Brightness As a Quality Factor," Journal of the Acoustical Society of America, Vol. 85, pp. 1819–1833, May 1989.

e. M. O'Donnell, et al., "Correlation-Based Aberration Correction in the Presence of Inoperative Elements," IEEE Transactions on Ultrasonics, Ferroelectrics, and Frequency Control, Vol. 39, pp. 700–707, November 1992.

All of the above disclose systems for determining aberration corrections using special adaptive modes nonconcurrent with imaging which may be used to correct nominal focusing delay and phase values during transmit beamformation and/or receive beamformation for the defocusing effects caused by aberrating regions. U.S. Pat. Nos. 4,471,785, 4,817,614 and 4,852,577 show means to determine focusing corrections at a single depth and to apply the aberration correction values obtained during the adaptive mode to all focal points during the imaging modes.

However, because optimal aberration corrections vary as the focus is dynamically varied in depth during receive beamformation, corrections determined at a single depth (or a few depths) do not optimally correct focus at all depths. On the other hand, determining aberration corrections at many depths through direct measurement, as suggested by U.S. Pat. Nos. 4,835,689, 4,937,775, 4,989,143 and 5,172,343, may require undesirable increases in 1) processing power, 2) computation time (which may slow frame rate), 3) memory, and 4) the number of non-imaging scan lines (which further slows frame rate).

None of the related art is able to take aberration correction values obtained from one range, scan mode, geometry, and transmit frequency and apply them to alternative ranges, alternative scan modes, alternative scan geometries, and/or alternative transmit/receive frequencies. For example, if an imaging system were to acquire both color Doppler flow scan lines (color Doppler F-mode) using a steered linear scan geometry and gray scale image scan lines (B-mode) using a Vector® scan geometry, the related art systems would require separate aberration correction values for each mode, geometry, and frequency and would not be able to use aberration correction values obtained from one mode, geometry, and frequency to apply to the other modes, geometries, and frequencies.

Accordingly, it is desired to provide a method and apparatus for determining aberration correction values that can be applied for all focal points for any scan mode, scan geometry or frequency without reducing frame rate or requiring special or separate acquisition modes apart from normal imaging modes.

SUMMARY OF THE INVENTION

An adaptive focusing ultrasound beamformer system operates in conjunction with an array which has a plurality of transducer elements, with each transducer element having an associated variable delay and gain. Ultrasound pulses are transmitted from the ultrasound array through an aberrating region and focused at a specified transmit depth in the medium. Reflected ultrasound pulses, also distorted by passage through the aberrating region, are received on the same array. A first set of aberration correction values (preferably the delay variations due to the aberrations) for each transducer element at a specified measurement depth (preferably the transmit depth) are estimated. The co-pending and above-identified patent application entitled: METHOD AND APPARATUS FOR REAL-TIME, CONCURRENT ADAPTIVE FOCUSING IN AN ULTRASOUND BEAMFORMER IMAGING SYSTEM describes one aberration correction value measurement approach.

The present invention provides a method for storing and retrieving aberration correction values measured and applied by an adaptive focusing ultrasound imaging system. The method requires storage of measured aberration correction values corresponding to each transducer element or element subarray and a first set of measurement depths (preferably at the transmit focal point), and retrieval of a second set of aberration correction values by a geometric transform indexing rule appropriate to each transducer element or element subarray and any depth location (preferably any transmit or dynamic receive focal point) in the imaged subject.

According to one aspect of the invention, measured correction values are stored during one imaging (scanning) mode, including, but not limited to, B-mode (gray-scale imaging) or color Doppler F-mode (flow or color Doppler imaging), and are retrieved and may be applied to any modes, including non-scanning modes such as spectral Doppler (D-mode) or M-mode.

According to a second aspect of the invention, measured aberration correction values are stored during one scan geometry format, including, but not limited to, sector, Vector® linear curved linear, steered linear, steered curved linear and curved Vector®, and are retrieved and may be applied to any other or the same scan geometry format.

According to another aspect of the invention, the apparatus preferably includes an index table coupled to an aberration correction value table (the values are preferably delay variations, although delay and amplitude variations are also possible values). Aberration correction values obtained at a measurement depth are transformed to aberration correction values at a requested image location. The transformation includes the steps of generating index values in an index table used to retrieve a measured aberration correction value for use at any image location. The measured aberration correction values are then placed in the aberration correction value table. Index values from the index table are selected responsive to requested element, scan line number, and location depth (or range) in order to retrieve the appropriate aberration correction value(s). The aberration correction value table outputs an aberration correction value responsive to the index value output from the index table. Finally, a processor is coupled to the index table for selecting a measurement scan line and measurement depth (range) when storing measured aberration correction values, and for retrieving a transformed aberration correction value for a requested scan line and requested image depth (range).

According to yet another aspect of the invention, interpolation may be performed between a first index value and a second index value.

Other aspects and advantages of the present invention can be seen upon review of the figures, the detailed description, and the claims which follow.

BRIEF DESCRIPTION OF THE FIGURES

FIGS. 1a and 1b conceptually depict the transmission and reception of ultrasound scan lines to and from body tissue.

FIGS. 2a–c illustrate an ultrasound imaging system, including the relationship of the geometric aberration transform to a transmit beamformer, two receive beamformers, and an adaptive focus control according to the present invention.

FIG. 4 illustrates a distorted and a straight scan line passing through an aberrating region to a focal point in a subject.

FIG. 5 illustrates a common path through an aberrating region resulting in the same delay correction value for an element at multiple focal points.

FIGS. 6a and 7 illustrate the use of measured aberration correction values at a current focal depth according to the present invention.

FIGS. 6b and 6c illustrate a three-dimensional representation of measured aberration correction values as a function of scan line number and element number, and the use of a GAT™ index with the aberration correction values, respectively, according to the present invention.

FIG. 14 illustrates a GAT™ function referring to a non-existent scan line according to the present invention.

FIG. 15 illustrates a GAT™ function referring to a scan line number outside an active aperture according to the present invention.

FIG. 21 illustrates a memory mapping of a GAT™ delay table according to the present invention.

DETAILED DESCRIPTION OF THE INVENTION

The present invention represents a component of a medical ultrasound imaging system for which additional patent applications, listed above, have been simultaneously filed in the United States Patent and Trademark Office. These applications are hereby incorporated by reference.

Figure 2B:
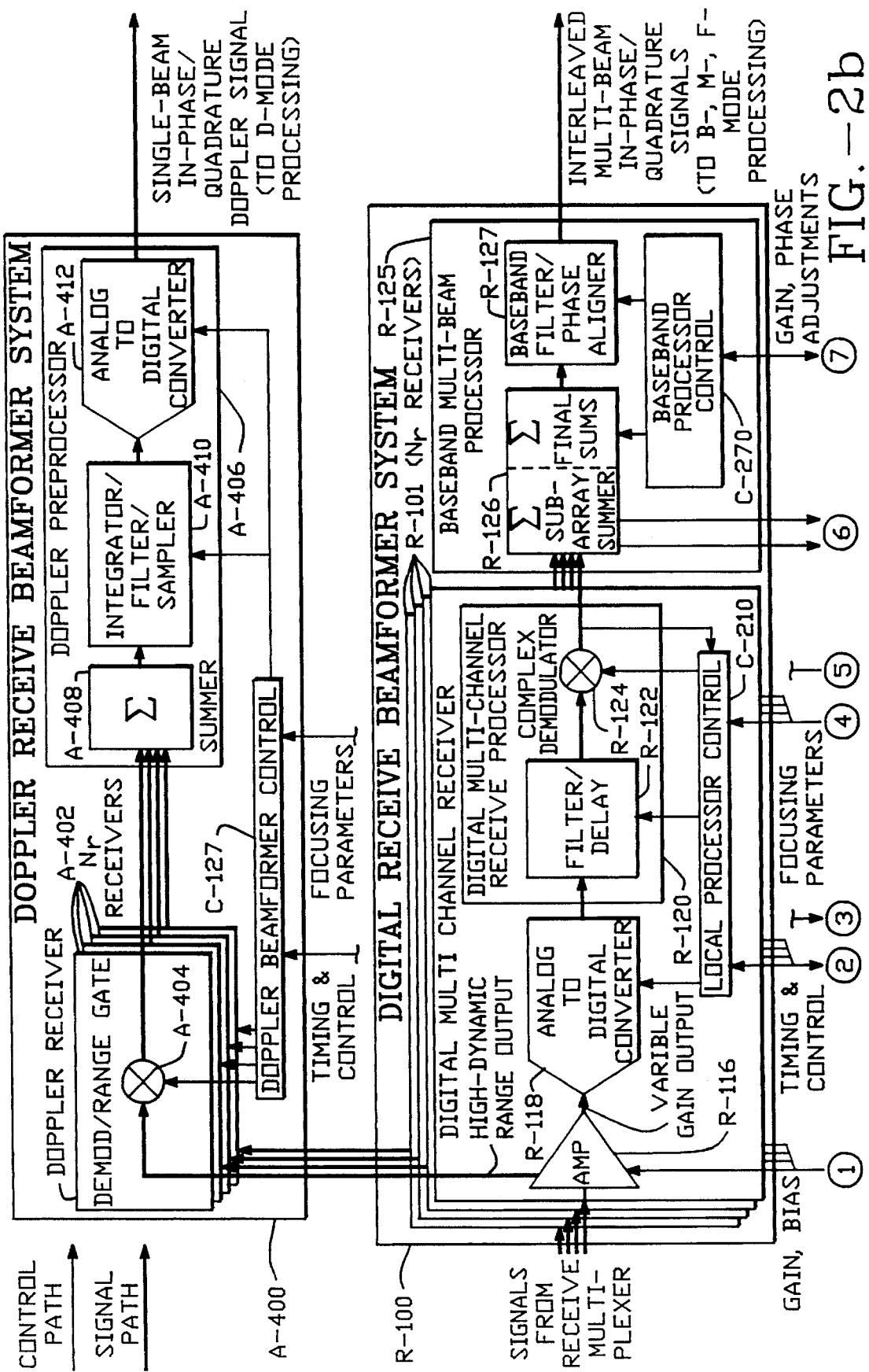
Figure 2C:
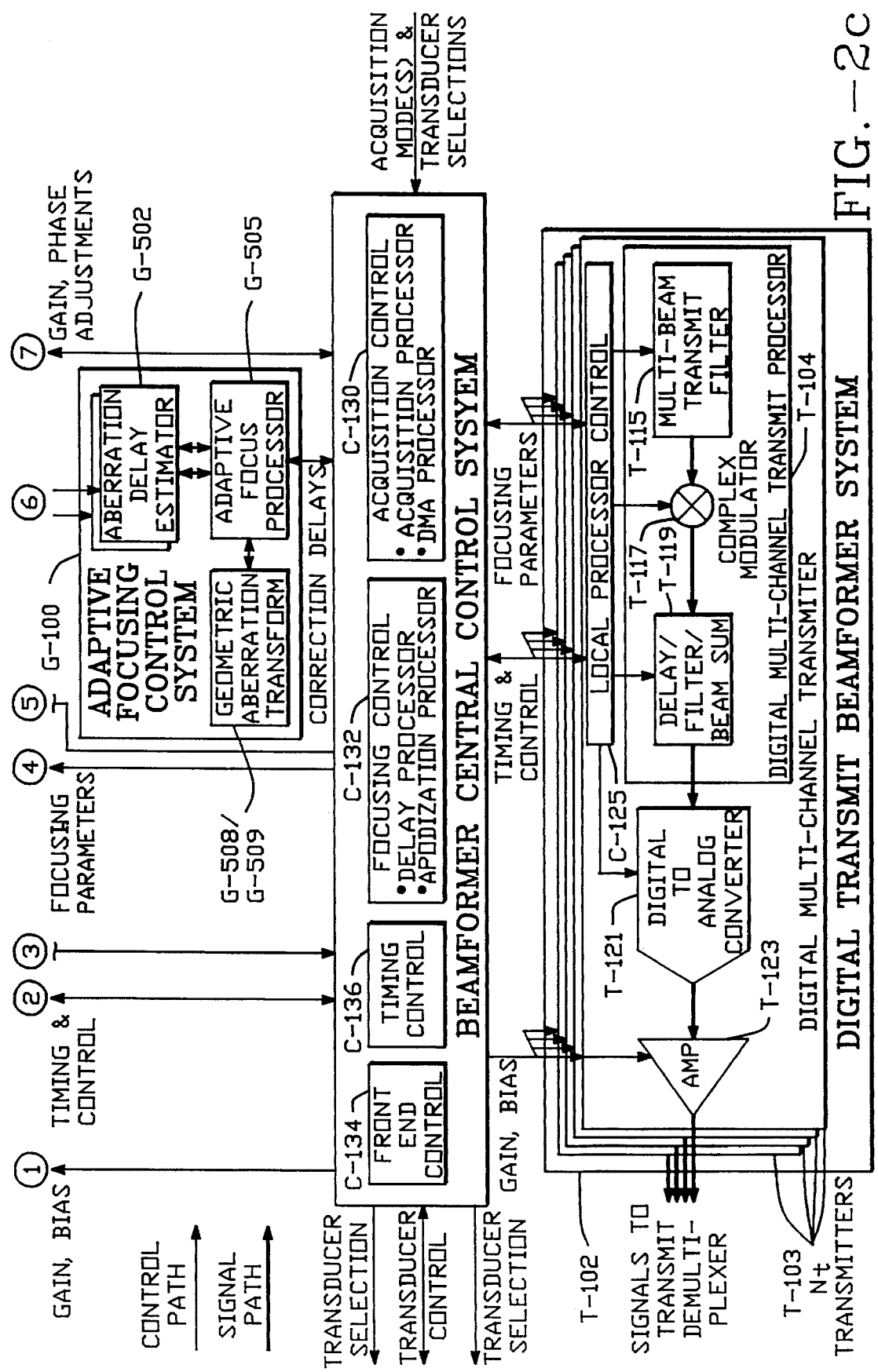
Figure 3:
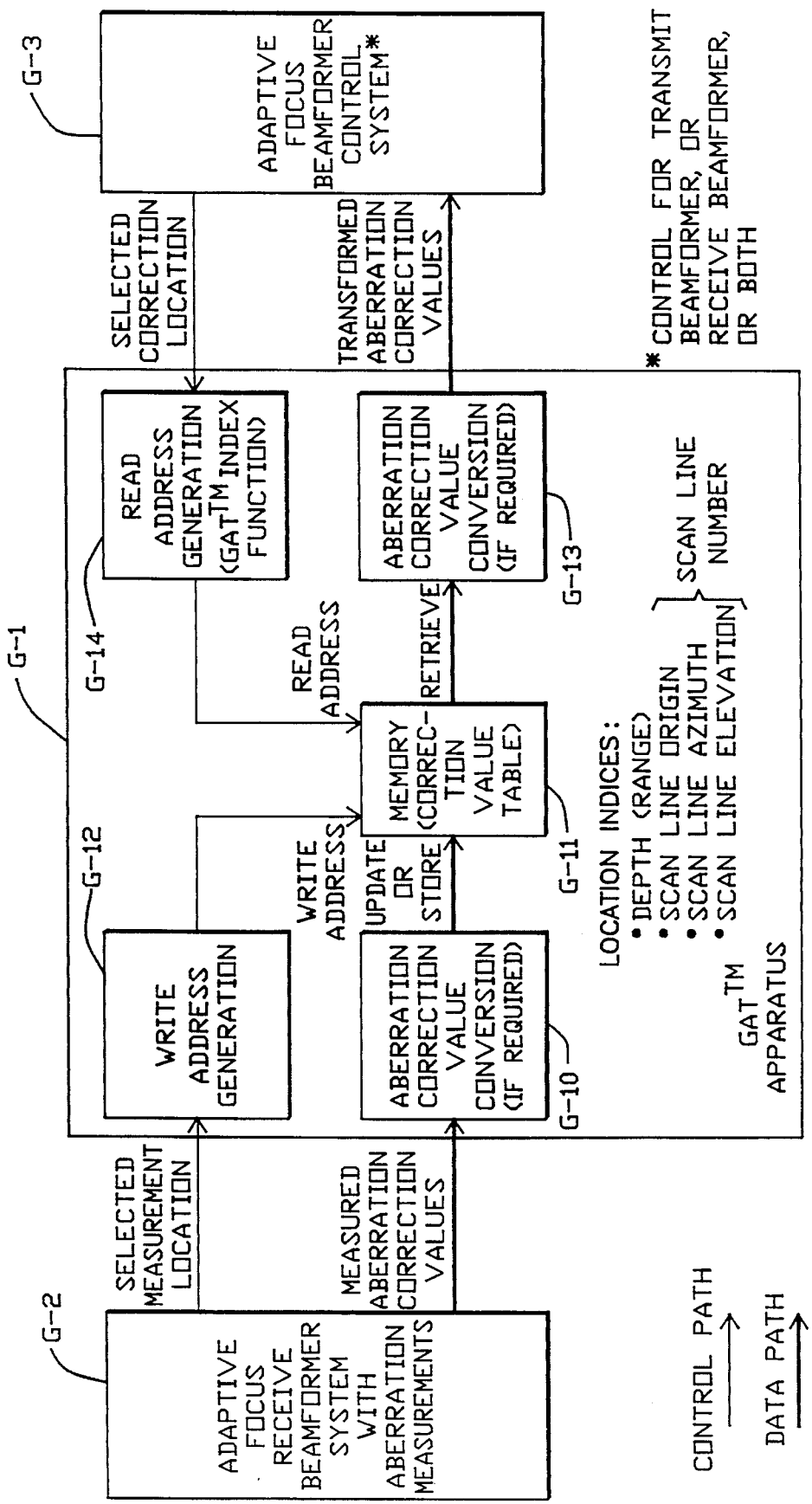
FIG. 3 illustrates a functional representation of a Geometric Aberration Transform (GAT™) apparatus showing data and control paths according to the present invention.
Figure 19:
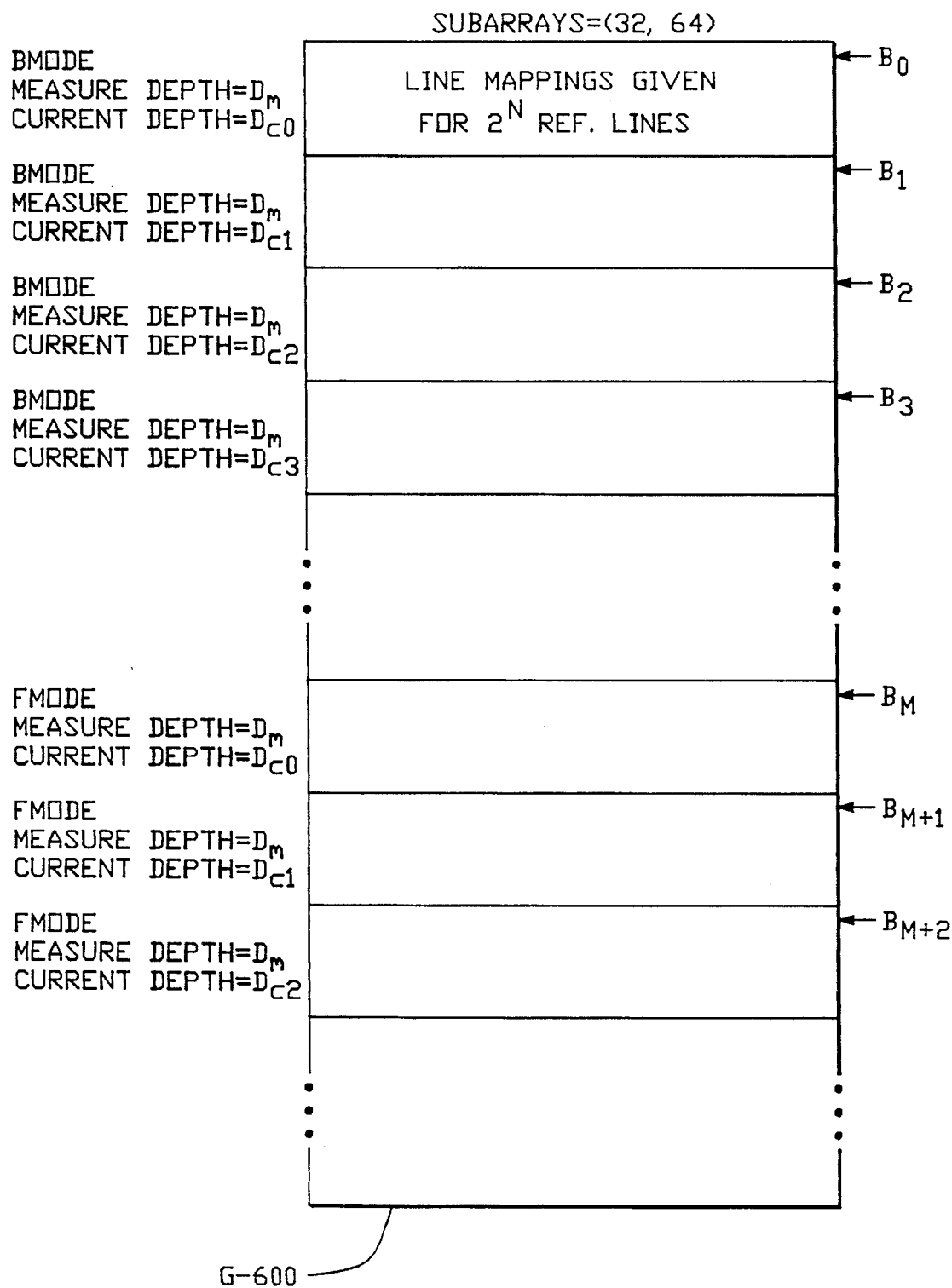
FIG. 19 illustrates a memory mapping of a GAT™ index table according to the present invention.
Figure 20:
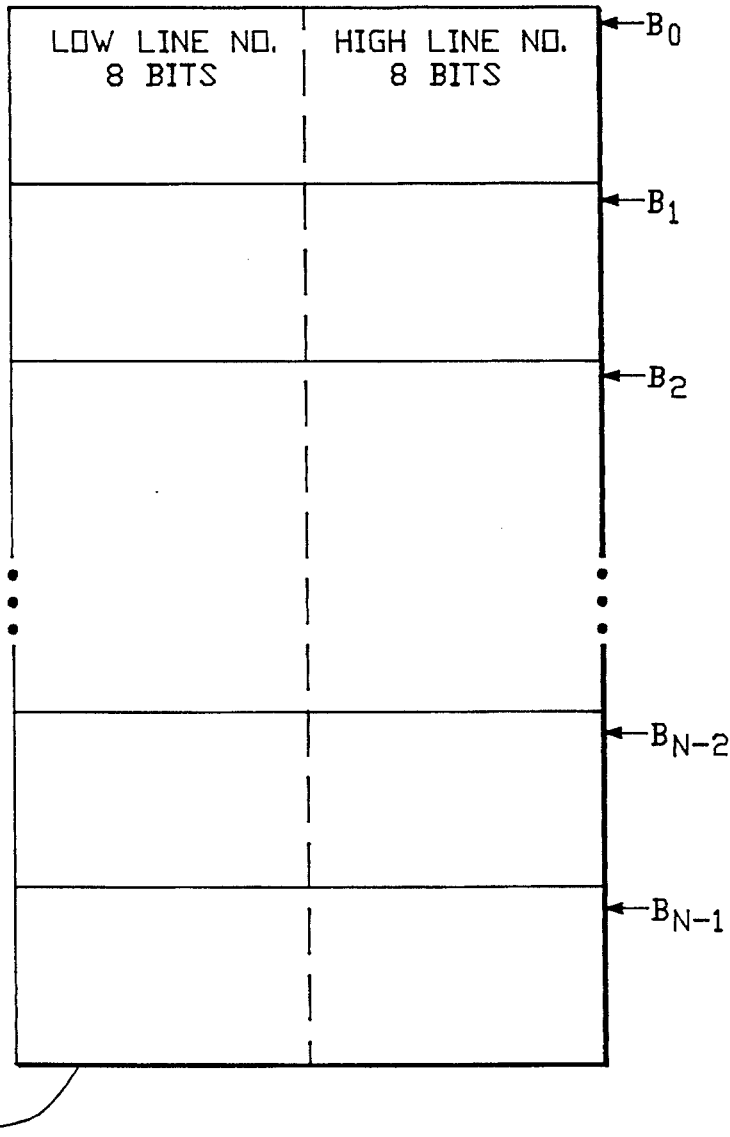
FIG. 20 illustrates a memory mapping of a GAT™ high/low table according to the present invention.

FIGS. 1a and 1b conceptually depict the transmission and reception of ultrasound scan lines to and from focal points such as $r_1$, $r_2$ and $r_3$ in body tissue. FIGS. 2a–c illustrate an ultrasound imaging system with an adaptive focusing control system G-100. FIG. 3 depicts a block diagram of a GAT™ apparatus according to the present invention. FIGS. 4–18 illustrate an implementation of a GAT™ apparatus and method. FIG. 17 illustrates the interface between the digital receive beamformer system R-100 and beamformer central control system C-104 in FIGS. 2b–c. Finally, FIGS. 19–21 illustrate a GAT™ indexing rule according to the present invention.

FIG. 3 depicts a functional data path and control path representation of a GAT™ apparatus G-1. This apparatus may be used with any new or prior art adaptive focusing beamformer system that generates measurements of aberration correction values, including the co-pending and above-identified patent application entitled: METHOD AND APPARATUS FOR REAL-TIME, CONCURRENT ADAPTIVE FOCUSING IN AN ULTRASOUND BEAMFORMER IMAGING SYSTEM. Measured aberration correction values from selected measurement locations, preferably the transmit focus depth, are provided to GAT™ apparatus G-1 by an adaptive focus receive beamformer system G-2, which are stored into GAT™ aberration correction value memory G-11 after optional conversion of the measured aberration values. For example, the beamformer system G-2 may provide aberration correction values as phase variations, which are converted by aberration correction value conversion G-10 to equivalent delay values for storage to memory G-11. A write address generation G-12 stores the aberration correction values by measurement location. A location is uniquely identified by scan line number and depth (range) along the scan line. An adaptive focus beamformer control system G-3, operating in conjunction with a receive beamformer and/or a transmit beamformer retrieves transformed aberration correction values for a requested image location (preferably a transmit or dynamic receive focal point) by looking up the correction values using a GAT™ index function in the read address generation G-14. Optionally, aberration correction values stored in memory G-11 can be converted as required by aberration correction value conversion G-13 into values appropriate for adaptive focus beamformer control G-3, such as conversion from delay correction values to phase correction values.

A. Definitions

1. Scan Lines

A scan line is a straight line through a space on which samples of an image are presumed to lie. A transmit scan line is such a line on which an associated transmit beam is presumed to lie. A receive scan line is such a line on which an associated receive beam is presumed to lie. A scan line is spatially oriented by its origin along a transducer array, its azimuthal angle with respect to a line normal to the array face, and its elevation with respect to the normal line.

2. Subarrays

A subarray is any grouping of transducer elements, including the special case of a single transducer element. In the preferred embodiment of this invention, a subarray typically comprises four spatially adjacent elements.

3. Measured Aberration Correction

Value(s)

Measured aberration correction values are values generated by an adaptive focusing beamformer system, that represent metrics of variations at a measurement depth for a given transducer element in the parameters that affect transmit focusing, receive focusing, or both, due to an aberrating region in the propagating medium. In the preferred embodiment, the values are delay variations (possibly converted, for example, from element-to-element phase differences), although other values may be used, such as phase variations or amplitude variations. Measured correction values and measured values are used interchangeably herein for measured aberration correction values.

4. Transformed Aberration Correction Values

Transformed aberration correction values are output values from a GAT™ apparatus produced by a request from an adaptive focusing beamformer system and represent metrics of variations at a requested image location for a given transducer element in the parameters that affect transmit focusing, receive focusing, or both, due to an aberrating region in the propagation medium. In the preferred embodiment, the values are delay focusing corrections for both transmit and receive beamforming, although other values are possible, such as both delay and amplitude focusing corrections. Transformed correction values and transformed values are used interchangeably for transformed aberration correction values.

5. Correction Profile

A correction profile is a sequence of aberration correction values as a function of transducer element position.

6. Location

A location is a point position in the image uniquely determined by scan line number and depth (range) along that scan line from the scan line origin.

7. Current Location

The location of the current scan line and current range in a scan geometry format that evolves with time.

8. Scan Line Number

The scan line number is a single index that uniquely corresponds to the three spatial location attributes (origin, azimuthal angle, and elevational angle) of a scan line, thereby simplifying the indexing schemes of the GAT™ tables.

9. GAT™ Index Value

The GAT™ index value is a scan line number output by the GAT™ index function and used to look up the transformed aberration correction value.

10. Correction Location

The correction location, or correction point, is a point for which a transformed aberration correction value is requested, uniquely determined by a correction scan line number and a correction depth. In the apparatus section below, correction location, correction scan line, and correction depth are alternatively referred to as current focal point, current scan line, and current depth, respectively.

B. Overview of the Preferred Beamformer System Architecture:

1. Ultrasound Signal Description:

With respect to the present invention, ultrasound imaging is accomplished by firing (transmitting) into body tissue or other objects to be imaged a scan sequence of focused ultrasonic beams centered along straight lines in space called transmit scan lines (FIG. 1a). The transmit scan lines are generated by a transmit beamformer and an ultrasound transducer array. The transmit scan lines are spaced to produce a planar linear, planar sector or other display of the tissue via a pre-defined firing or scanning pattern. Focused to some defined depth in the tissue, the ultrasonic transmit continuous-wave (CW) or pulse-wave (PW) signal, propagating at an assumed constant propagation velocity of nominally $c=1540$ m/sec through the tissue, interacts with the tissue and reflects a small portion of the signal back to the ultrasound transducer array that initiated the ultrasound signal. The round trip delay time is shortest for those targets closest to the ultrasound transducer array, and longest for those targets farthest from the transducer array. With the application of appropriate time delays, the receive beamformer (FIG. 1b) can dynamically focus receive beams along straight lines in space called receive scan lines commencing, for example, with the shallowest range (depth) of interest and evolving toward the deepest range of interest.

FIGS. 1a and 1b depict representations of transmit and receive scan lines (solid) and straight-line signal propagation paths from individual elements (dashed), respectively. In FIG. 1a, the transmit beamformer is generally identified by T-50 with the transducer array T-52 containing a multiplicity of individual transducer elements T-54 organized as a linear phased array in this particular embodiment. As is known in the art, there are a great variety of transducer array configurations available for use with ultrasound transmit and receive beamformer systems. As can be seen in FIG. 1a, the transmit beamformer T-50 sends appropriately time-delayed electrical signals to the individual transducer elements T-54. These transducer elements T-54 then in turn convert electrical signals into acoustic waves that propagate into the body tissue T-56. By applying different time delays to the excitation signals sent to the individual transducer elements T-54, transmit scan lines T-60 and T-62, having respective foci $r_1$ and $r_2$, can be established. It is to be understood that each of these transmit scan lines is representative of a center line of a different transmit beam which is steered and focused into the body to be imaged.

The transmit beamformer T-50 can generate simultaneous multiple beams along different scan lines, or different focal depths along the same scan line (compound focus). Further, the multiple transmit beams can each scan the entire image format or be transmitted such that each of the multiple beams only scans a specified section of the image format.

FIG. 1b depicts a digital receive beamformer R-58 which is also connected to the transducer array T-52. Also depicted in FIG. 1b are receive scan lines R-64, R-66 corresponding to a dynamically focused first receive beam and a dynamically focused second receive beam, respectively. The beams are sampled in range at a plurality of focal depths ($r_1, r_2, r_3$) along each scan line. In the digital receive signal path of the present invention, transducer array signals can be selectively separated into data representative of multiple individual beams.

Each scan line of a transmit or receive scan pattern can be parameterized by the origin on the transducer array, the scan line orientation (angle θ) and the focus depth or range (r). The ultrasound imaging system of the present invention stores a pre-computed sparse data set of focusing time delay and aperture apodization values indexed by these parameters (based on geometric considerations as is known in the art) and expands the values by real-time computational means to control the transmit and receive beamformation systems that produce the desired scan lines.

2. Beamformer System:

FIGS. 2a, 2b, 2c depict an overall block diagram of a medical ultrasound imaging system R-20. Ultrasound system R-20 includes a beamformer system R-22, one or more transducers T-112, a display processing system R-26 with a display R-28 and an ultrasound imaging system control R-40.

In FIGS. 2a, 2b, or 2c, the beamformer system R-22 includes inventive and novel (1) digital transmit beamformer system T-102, (2) digital receive beamformer system R-100, (3) beamformer central control system C-104, (4) adaptive focusing control system G-100 and (5) Doppler receive beamformer system A-400. These systems are depicted as high level, functional block diagrams. The blocks are abstracted from the actual implementation of a preferred embodiment in order to better illustrate the signal processing functions performed.

As indicated in FIG. 2a, beamformer system R-22 provides two sources of digital beam data to the display processing system R-26: (1) Doppler receive beamformer single-beam complex in-phase/quadrature data representing coherent temporal sampling of the beam (CW case) or coherent temporal sampling at one range location along the beam (PW case), and (2) digital receive beamformer multi-beam complex in-phase/quadrature data representing coherent sampling in range along each receive scan line. Beamformer system R-22 can be operated to provide a sequence of scan lines and associated samples as above to provide data for a variety of display modes. By way of example, possible display modes and their associated processors include (1) brightness image and motion processor R-30 for B-mode (gray-scale imaging) and M-mode (motion display), (2) color Doppler image processor R-32 for F-mode (flow imaging), and (3) spectral Doppler processor R-34 for D-mode. Additional display modes can be created from the two complex data sources of R-22, as will be obvious to those skilled in the art.

Ultrasound system R-20 also includes a transmit demultiplexer T-106 for routing the output waveforms from the transmitters T-103 to the transducer elements T-114, a receive multiplexer R-108 for routing the input waveforms from the transducer elements T-114 to the receivers R-101, one or more transducer connectors T-110 and transducer arrays T-112. Many types of transducer arrays can be used with the present system.

Ultrasound system R-20 also includes an ultrasound imaging system control R-40, archival memory R-38 for storing scan parameters and scan data, and operator interface R-36.

As used herein, the term ultrasonic refers to frequencies above the range of human hearing. However, the transducer arrays T-112 are optimized for frequencies typically within the range of 2–10 MHz.

The transducer array T-112 is interchangeable with a variety of different kinds of transducer arrays, including but not limited to linear, curved, curvi-linear and annular transducer arrays. A variety of transducer array shapes and frequencies are desirable in order to satisfy the requirements of a variety of different clinical settings. However, the transducer arrays T-112 are typically optimized for frequencies within the above specified range of 2–10 MHz. The medical ultrasound system R-20 performs the three major functions of driving the ultrasonic transducer array of elements T-114 to transmit focused ultrasound energy, receiving and focusing back-scattered ultrasound energy impinging on the transducer array T-114, and controlling the transmit and receive functions to scan a field of view in scan formats including (but not limited to) linear, sector or Vector® format.

In FIGS. 2a, 2b, 2c, the control signals are communicated over the light lead lines while the signal paths are depicted with heavy lead lines.

3. Digital Transmit Beamformer System:

The digital transmit beamformer T-102 (FIG. 2c) is the subject of the above-identified application entitled: METHOD AND APPARATUS FOR TRANSMIT BEAMFORMER SYSTEM which has been incorporated herein by reference. It is to be understood that in a preferred embodiment, the digital transmit beamformer T-102 is comprised of a plurality of digital multi-channel transmitters T-103, one digital multi-channel transmitters for one or more of the individual transducer elements T-114. The transmitters are multi-channel in that each transmitter can process, in a preferred embodiment, up to four independent beams. Thus, for example, 128 multi-channel transmitters have 512 channels. In other preferred embodiments, more than four independent beams can be achieved. Processing more than four beams per processor is within the scope of the invention.

In a preferred embodiment, each of the digital multi-channel transmitters T-103 produces as its output in response to an excitation event the superposition of up to four pulses, each pulse corresponding to a beam. Each pulse has a precisely programmed waveform, whose amplitude is apodized appropriately relative to the other transmitters and/or channels, and delayed by a precisely defined time delay relative to a common start-of-transmit (SOT) signal. Transmitters T-103 are also capable of producing CW.

Each digital multi-channel transmitter T-103 conceptually comprises a multiple beam transmit filter T-115 which provides an output to a complex modulator T-117. The output from complex modulator T-117 is communicated to a delay/filter block T-119, and therefrom is provided to a digital-to-analog converter (DAC) T-121. The output of the DAC T-121 is amplified by an amplifier T-123. The multiple beam transmit filter T-115, the complex modulator T-117 and the delay/filter block T-119 comprise a digital multi-channel transmit processor T-104.

The transmit filter T-115 can be programmed to provide any arbitrary real or complex waveform responsive to a start-of-transmit (SOT) signal. The transmit filter T-115 is implemented with a memory which stores real or complex samples of any desired and arbitrary pulse waveform, and a means of reading the samples out sequentially in response to the start-of-transmit (SOT) signal delayed by a component of the focusing delay. In a preferred embodiment, the memory of T-115 is programmed to store baseband representations of real or complex pulse envelopes.

Block T-115, although primarily a memory, is referred to herein as a transmit filter, as the output of block T-115 can be thought of as the time response of a filter to an impulse. The complex modulator T-117 upconverts the envelope to the transmit frequency and provides appropriate focusing phase and aperture apodization.

Delay/filter block T-119 conceptually provides any remaining focusing delay component and a final shaping filter. The digital-to-analog converter (DAC) T-121 converts the transmit waveform samples to an analog signal. The transmit amplifier T-123 sets the transmit power level and generates the high-voltage signal which is routed by the transmit demultiplexer T-106 to a selected transducer element T-114.

Associated with each multi-channel transmit processor T-104 is a local or secondary processor control C-125 which provides control values and parameters, such as apodization and delay values, to the functional blocks of multi-channel transmit processor T-104. Each local or secondary channel control C-125 is in turn controlled by the central or primary control system C-104.

4. Digital Receive Beamformer System:

The digital receive beamformer R-100 (FIG. 2b) is the subject of the above-identified application entitled: METHOD AND APPARATUS FOR RECEIVE BEAMFORMER SYSTEM which has been incorporated herein by reference.

The signals from the individual transducer elements T-114 represent return echoes or return signals which are reflected from the object being imaged. These signals are communicated through the transducer connectors T-110 to the receive multiplexer R-108. Through multiplexer R-108, each transducer element T-114 is connected separately to one of the plurality of digital multi-channel receivers R-101 which taken together and along with the baseband multi-beam processor R-125 comprise the digital receive beamformer R-100 of the invention. The receivers are multi-channel in that each receiver can process, in a preferred embodiment, up to four independent beams. Processing more than four beams per processor is within the scope of the invention.

Each digital multi-channel receiver R-101 can, in a preferred embodiment, comprise the following elements which are represented by the high level function block diagram in FIG. 2b. These elements include a dynamic low-noise and variable time-gain amplifier R-116, an analog-to-digital converter (ADC) R-118, and a digital multi-channel receive processor R-120. The digital multi-channel receive processor R-120 conceptually includes a filter/delay unit R-122 and a complex demodulator R-124. The filter/delay unit R-122 provides for filtering and coarse focusing time delay. The complex demodulator R-124 provides for fine focusing delay in the form of a phase rotation and apodization (scaling or weighting), as well as signal demodulation to or near baseband. The exact functioning and composition of each of these blocks will be more fully described hereinbelow with respect to the remaining figures.

The digital multi-channel receivers R-101 communicate with baseband multi-beam processor R-125 where the signal samples of each beam from each receive processor are summed by summer R-126, and the summation provided to baseband filter/phase aligner R-127. The baseband filter/phase aligner R-127 provides for filtering, and receive-scan-line-to-receive-scan-line or beam-to-beam phase alignment as discussed in the above-referenced and incorporated patent applications entitled: METHOD AND APPARATUS FOR COHERENT IMAGE FORMATION, METHOD AND APPARATUS FOR ADJUSTABLE FREQUENCY SCANNING IN ULTRASOUND IMAGING, and METHOD AND APPARATUS FOR RECEIVE BEAMFORMER SYSTEM.

A local or secondary control C-210 is associated with each digital multi,channel receiver R-101. Local multi-channel processor control C-210 is controlled by central or primary control C-104 and provides timing, control and parameter values to each said receiver R-101. The parameter values include time delay values and apodization values.

The digital receive beamformer system R-100 additionally includes a baseband processor control (or phase aligner processor control) C-270 which controls the operation of baseband filter/phase aligner R-127 and the summing gain of summer R-126. Baseband processor control C-270 is controlled by central control C-104.

5. Doppler Receive Beamformer System:

The Doppler receive beamformer system A-400 for D-mode acquisition includes analog receivers A-402, each of which receives echo signals from a respective one or more transducers T-114. Each of the Doppler receivers A-402 includes a demodulator/range gate A-404 which demodulates the received signal and gates it (PW mode only) to select the echo from a narrow range. The analog outputs of the Doppler receivers A-402 are communicated to a Doppler preprocessor A-406. In preprocessor A-406, the analog signals are summed by summer A-408 and then integrated, filtered, and sampled by analog processor A-410. Preprocessor A-406 then digitizes the sampled analog signal in an analog-to-digital converter (ADC) A-412. The digitized signal is communicated to the display processing system R-26. The Doppler receive beamformer system is the subject of a co-pending patent application entitled: METHOD AND APPARATUS FOR DOPPLER RECEIVE BEAMFORMER SYSTEM which has been incorporated herein by reference.

Associated with all Doppler receivers A-402 is a single local or secondary Doppler beamformer control C-127. Doppler beamformer control C-127 is controlled by central or primary control system C-104 and provides control and focusing parameter values to the Doppler receive beamformer system A-400.

As pointed out in the above patent application describing the Doppler receive beamformer system A-400, the present beamformer system R-22 advantageously combines a digital receive beamformation system R-100 and a Doppler receive beamformation system A-400 in a manner which uses the same digital transmit beamformation system T-102 and the same transducer array and allows the digital receive beamformation system R-100 to be optimized for imaging modes such as B- and F- mode, and therefore has high spatial resolution, while the accompanying Doppler receive beamformation system has a wide dynamic range and is optimized for use in acquiring D-mode signals.

6. Beamformer Central Control System:

The beamformer central control system C-104 of the present invention controls the operation of the digital transmit beamformer system T-102, the digital receive beamformer system R-100, the Doppler receive beamformer system A-400, and the adaptive focusing control system G-100. The beamformer control is more fully discussed in the above referenced and incorporated patent application entitled: METHOD AND APPARATUS FOR FOCUS CONTROL OF TRANSMIT AND RECEIVE BEAMFORMER SYSTEMS.

The main control functions of the central control system C-104 are depicted in FIG. 2c. The control functions are implemented with four components. The acquisition control C-130 communicates with the rest of the system including the ultrasound system control R-40 and provides high level control and downloading of scanning parameters. The focusing control C-132 computes in real time the dynamic delay and apodization digital values required for transmit and receive beamformation, which includes pre-computed and expanded ideal values plus any estimated correction values provided by adaptive focusing control system G-100. The front end control C-134 sets the switches for the demultiplexer T-106 and the multiplexer R-108, interfaces with the transducer connectors T-110, and sets the gain and bias levels of all transmitter amplifiers T-123 and all receive amplifiers R-116. The timing control C-136 provides all the digital clocks required by the digital circuits. This includes the sampling clocks for all the transmitter DACs T-121 and receiver ADCs R-118.

In a preferred embodiment central control C-104 expands sparse tables of focusing time delay and aperture apodization values based on pre-computed and stored data, through such techniques as interpolation and extrapolation. The expanded delay and apodization values are communicated to the local processor controls, where the delay and apodization data expansion in range is completed to per-transducer-element, per-sample, per-beam values.

7. Adaptive Focusing Control System:

Adaptive focusing control system G-100 provides for real time concurrent adaptive focusing. Adaptive focusing control system G-100 is comprised of an adaptive focus processor G-505 which provides focus correction delay values to the focus control C-132 of the central control C-104. Adaptive focus processor G-505 operates on output produced by aberration value estimators G-502 from data gathered from the subarray summers R-126 of the digital receive beamformer system R-100. Accordingly, aberration correction values, preferably aberration delay and amplitude values, are adaptively measured for each receive scan line or for a subset of receive scan lines in range regions corresponding to transmit focal depths by the adaptive focusing control subsystem G-100 shown in FIG. 2c. Adaptive focusing control system G-100 is more fully described in the above-referenced and incorporated co-pending patent application entitled: METHOD AND APPARATUS FOR REAL-TIME, CONCURRENT ADAPTIVE FOCUSING IN AN ULTRASOUND BEAMFORMER IMAGING SYSTEM.

It is to be understood that in addition to the adaptive focusing control system which adjusts focus delays, that a number of adaptive control systems are contemplated. These systems, by way of example, include (1) adaptive contrast enhancement control system for adjusting focus delays and aperture apodizations, (2) adaptive interference cancellation control for adjusting focus delays and phases, aperture apodizations, and (3) adaptive target enhancement control for adjusting focus delays and phase, aperture apodizations, imaging transmit and receive frequencies and baseband waveform shaping.

Another aspect of adaptive focusing which can be included in the preferred embodiment of the adaptive focusing control system G-100 is a geometric aberration transform (GAT™) device G-508/509 which can provide aberration correction delay values to the adaptive focus processor G-505 for scan lines and scan line depth locations for which measured aberration values were not collected by aberration value estimators G-502. More specifically, measured aberration correction values are written to a delay table in GAT™ G-508/509. GAT™ G-508/509 retrieves values from the delay table according to GAT™ look-up rules to form focusing delay correction profiles across the aperture valid for depths, scan geometries, and acquisition modes other than the depth, scan geometry, and mode at which aberration correction values were measured. The geometric aberration transform device G-508/509 is more fully described below.

C. Method

This section refers to the storage and retrieval of correction values for elements of a transducer array. The invention and the text below apply equally to subarrays, groupings of a small number of adjacent elements; "elements" are used in the text to clarify the concepts disclosed.

The text also refers to "correction values." In the preferred embodiment, and in the text below, these are delay correction values (stored in a "delay table"). As described below, the invention applies equally to a broader class of measured correction values, including amplitude correction values and phase correction values.

1. Aberration Correction Values in Scan Regions Beyond Aberrating Regions

In a phased-array ultrasound system, ideal focusing delays $T_{ideal}$ for each element are calculated to compensate for the variation in propagation time from element E at position $\vec{E}$ to a desired focal point $\vec{P}$, illustrated in FIG. 4:

$$T_{ideal} \doteq \frac{|\vec{P} - \vec{E}|}{c_0} \quad (1)$$

where $c_O$ is the nominal speed of sound through a homogeneous medium and $|\vec{P}-\vec{E}|$ represents the distance between $\vec{P}$ and $\vec{E}$.

Equation (1) can also be written as a simple path integral along a straight dashed line G-202 from element position $\vec{E}$ to focal point $\vec{P}$:

$$T_{ideal} = -\frac{1}{c_0} \int_{\vec{P}}^{\vec{E}} ds. \quad (2)$$
$$\text{straight line}$$

These desired focusing delays $T_{ideal}$ can be implemented in an ultrasound imaging system using time delay, phasing, or, in the preferred embodiment, a combination of the two.

In a subject having an aberrating region G-201, the propagation delay $T_{inhom}$ (and hence the desired focusing delay) generally depends on the speed of sound through an aberrating region G-201. $T_{inhom}$ depends on the propagation time along a distorted (refracted) path represented by curved line G-200 from element position $\vec{E}$ to focal point $\vec{P}$. In integral form, $$T_{inhom} = -\int_{\vec{E}}^{\vec{P}} \frac{1}{c(x,y)} ds = -\frac{1}{c_0} \int_{\vec{E}}^{\vec{P}} n(x,y) ds, \quad (3)$$
$$\text{refracted path} \qquad \text{refracted path}$$

where $n(x,y)$ is the index of refraction defined by $n(x,y) \doteq |c_O/c(x,y)|$, and $c(x,y)$ is the spatially varying local speed of sound at a point $(x,y)$ within the propagating medium (which includes both the aberrating region and the non-aberrating region).

For the case of relatively small variations in the speed of sound, the integral in equation (3) can be approximated by an integral over a straight line G-202 from element position $\vec{E}$ to focal point $\vec{P}$, or $$T_{inhom} \approx -\frac{1}{c_0} \int_E^P n(x,y)ds. \qquad (4)$$
$$\text{straight line}$$

The focusing delay error $T_{ab}$, the aberration correction value due to aberrating region G-201, can be defined as:

$$T_{ab} \doteq T_{inhom} - T_{ideal} \approx -\frac{1}{c_0} \int_E^P (n(x,y)-1)ds. \qquad (5)$$
$$\text{straight line}$$

In other words, the focusing delay error $T_{ab}$ for element E and focal point $\vec{P}$ is determined by integrating over the variation (from nominal) in the index of refraction on a straight line G-202 from element position $\vec{E}$ to focal point $\vec{P}$.

The aberrating region G-201 (the region for which the speed of sound differs from the nominal value $c_O$) is assumed to have limited thickness. Because outside this region $n(x,y)=1$, the aberration correction value $T_{ab}$ defined in equation (5) has the same value for any set of focal points outside the aberrating region lying on a straight line from the given element position $\vec{E}$. FIG. 5 illustrates this graphically. Because focal points $\vec{P}_0$ through $\vec{P}_5$ lie on a straight line passing through element position $\vec{E}$, and lie outside the aberrating region G-201 delineated by the dotted line G-203, the propagation paths from element E to each focal point $\vec{P}_0$ to $\vec{P}_5$ pass through the same portion of the aberrating region G-201. Thus the aberration correction value $T_{ab}$ corresponding to element E for each focal point $\vec{P}_0$ to $\vec{P}_5$ is identical.

Figure 6A:
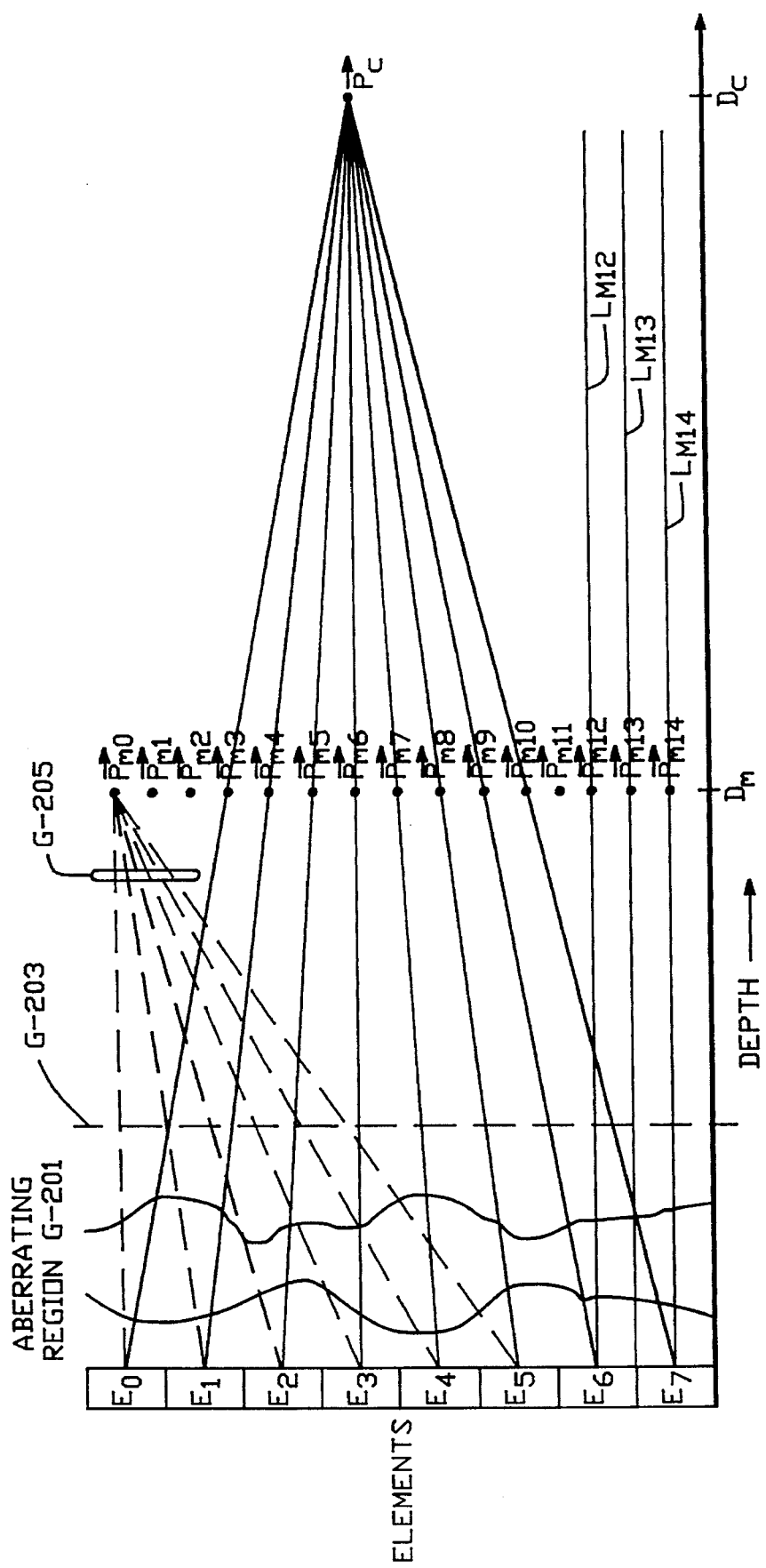

FIG. 6a shows how the principle above can be used to generate aberration correction profiles across the aperture at depths other than those depths at which correction values are measured. FIG. 6a shows an eight-element linear array $E_0$–$E_7$, which has generated fifteen parallel scan lines $L_{m0}$–$L_{m14}$, each normal to the array, in order to obtain aberration correction values (only scan lines $L_{m12}$, $L_{m13}$ and $L_{m14}$ are shown in FIG. 6a). Aberration correction profiles are measured at fifteen measurement focal points $\vec{P}_{m0}$–$\vec{P}_{m14}$, one on each scan line at a measurement depth $D_m$ (measured along the scan lines). For example, the measured correction values for focal point $\vec{P}_{m0}$ and elements $E_1$–$E_5$ represent delay variations along propagation paths shown by dashed lines G-205.

The aberration correction values $T_{meas}$ ($E_i,L_{mj},D_m$), corresponding to $i^{th}$ element $E_i$ and $j^{th}$ measurement scan line number $L_{mj}$ at the measurement depth $D_m$, are stored in a table G-400, represented in FIGS. 6b–c. Suppose it is now desirable to correct focus at a focal point $\vec{P}_c$ at depth $D_c$ in FIG. 6a. Element position $\vec{E}_0$ and measurement focal point $\vec{P}_{m3}$ are collinear with focal point $\vec{P}_c$. Therefore, the aberration correction value applicable to element $E_0$ at focal point $\vec{P}_c$ is the same as the correction value for element $E_0$ at measurement point $\vec{P}_{m3}$.

This relationship can be written:

$$T_{corr}(E_0,\vec{P}_c) = T_{meas}(E_0,\vec{P}_{m3}) \qquad (6)$$

where $T_{corr}(E_i,\vec{P}_c)$ is the correction value for focal point $\vec{P}_c$ and element $E_i$, and $T_{meas}(E_i,\vec{P}_{mj})$ is the measured correction value for element $E_i$ and measurement focal point $\vec{P}_{mj}$. Likewise, measurement focal point $\vec{P}_{m4}$ is collinear with element position $\vec{E}_1$ and the correction point $\vec{P}_c$, so $$T_{corr}(E_1,\vec{P}_c) = T_{meas}(E_1,\vec{P}_{m4}). \qquad (7)$$

Continuing likewise through all the elements, we can extract from the measured aberration correction values a complete correction profile (the focusing delay error to be corrected, as a function of element number) valid at the desired focal point $\vec{P}_c$:

$$T_{corr}(E_2,\vec{P}_c) = T_{meas}(E_2,\vec{P}_{m5})$$
$$T_{corr}(E_3,\vec{P}_c) = T_{meas}(E_3,\vec{P}_{m6})$$
$$T_{corr}(E_4,\vec{P}_c) = T_{meas}(E_4,\vec{P}_{m7}) \qquad (8)$$
$$T_{corr}(E_5,\vec{P}_c) = T_{meas}(E_5,\vec{P}_{m8})$$
$$T_{corr}(E_6,\vec{P}_c) = T_{meas}(E_6,\vec{P}_{m9})$$
$$T_{corr}(E_7,\vec{P}_c) = T_{meas}(E_7,\vec{P}_{m10})$$

2. GAT™ Function

In the example given above, we can restate equations (6), (7), and (8) as:

$$T_{corr}(E_i,\vec{P}_c) = T_{meas}(E_i,\vec{G}(E_i,\vec{P}_c,D_m)) \qquad (9)$$

Equivalently, we can replace the vector notation with a coordinate notation, substituting $L_c$ and $D_c$ for $\vec{P}_c$, and $G(.)$ and $D_m$ for $\vec{G}(.)$:

$$T_{corr}(E_i;L_c,D_c) = T_{meas}(E_i;G(E_i;L_c,D_c;D_m). \qquad (10)$$

where $L_c$ is the scan line number and $D_c$ the depth of correction focal point $\vec{P}_c$.

$G(.)$ in equation (10) is the GAT™ index function which relates the required correction at an element $E_i$, current line $L_c$ and current depth $D_c$ to an appropriate measured correction valve at a depth $D_m$ along a scan line $L_{mj}=G(E_i;L_c,D_c;D_m)$. The present invention determines values of the GAT™ index function and implements the mapping defined in equation (10). FIG. 6c illustrates the use of GAT™ index function G-401 with a GAT™ aberration correction value table G-400. Aberration correction value table G-400 contains measured delay correction values at measurement depth $D_m$ corresponding to elements $E_i$ and measurement scan lines $L_{mj}$. For element $E_6$, correction scan line $L_c$, measurement depth $D_m$, and correction depth $D_c$, GAT™ index function G-401 produces a GAT™ index value $G(E_6;L_c,D_c,D_m)$ at G-404 that corresponds to the appropriate scan line number $L_m$ for which the measured correction value $T_{meas}(E_6,L_m,D_m)$ may be found in aberration correction value table G-400. In this example, $$L_m=G(E_6;L_c;D_c;D_m) \qquad (11)$$

The aberration correction value $T_{meas}$ ($E_6,L_m,D_m$) is used to correct the focus at element $E_6$, scan line $L_c$, and correction depth $D_c$.

FIG. 6b shows measured aberration correction values for a measurement depth $D_m$ as in FIG. 6a, plotted as a function of measurement scan line number $L_{mj}$ and element number $E_i$. The vertical values on each curve G-15 represent the measured correction values for each measurement scan line $L_{m2}$, $L_{m3}$, etc., plotted as a function of element number $E_0$, $E_1$, etc. Curve G-20 represents the locus of the GAT index function $G(E_i;L_c;D_c;D_m)$ for correction point $\vec{P}_c$ (correction line $L_c$ and correction depth $D_c$) as in FIG. 6a, plotted vs. element number in the "element number"-"measurement scan line number" plane of the drawing. Transformed correction values G-30 are obtained for each element $E_i$ according to the GAT index value for that element, as described above. Transformed correction profile G-40 is formed by taking transformed correction values G-30 for each element $E_i$, and is plotted as transformed aberration correction value vs. element number on graph G-50. Transformed correction profile G-40 is essentially a "slice" through the measured aberration correction values, projected onto the "delay error"-"element number" plane.

These transformed aberration correction values extracted from measurements made in one measurement mode may then be used in the same or other modes, such as B-mode (gray-scale imaging mode), color Doppler F-mode (flow or color Doppler imaging mode), M-mode (motion imaging mode), and D-mode (spectral Doppler mode), or in interleaved or alternating combinations of these modes.

Figure 8:
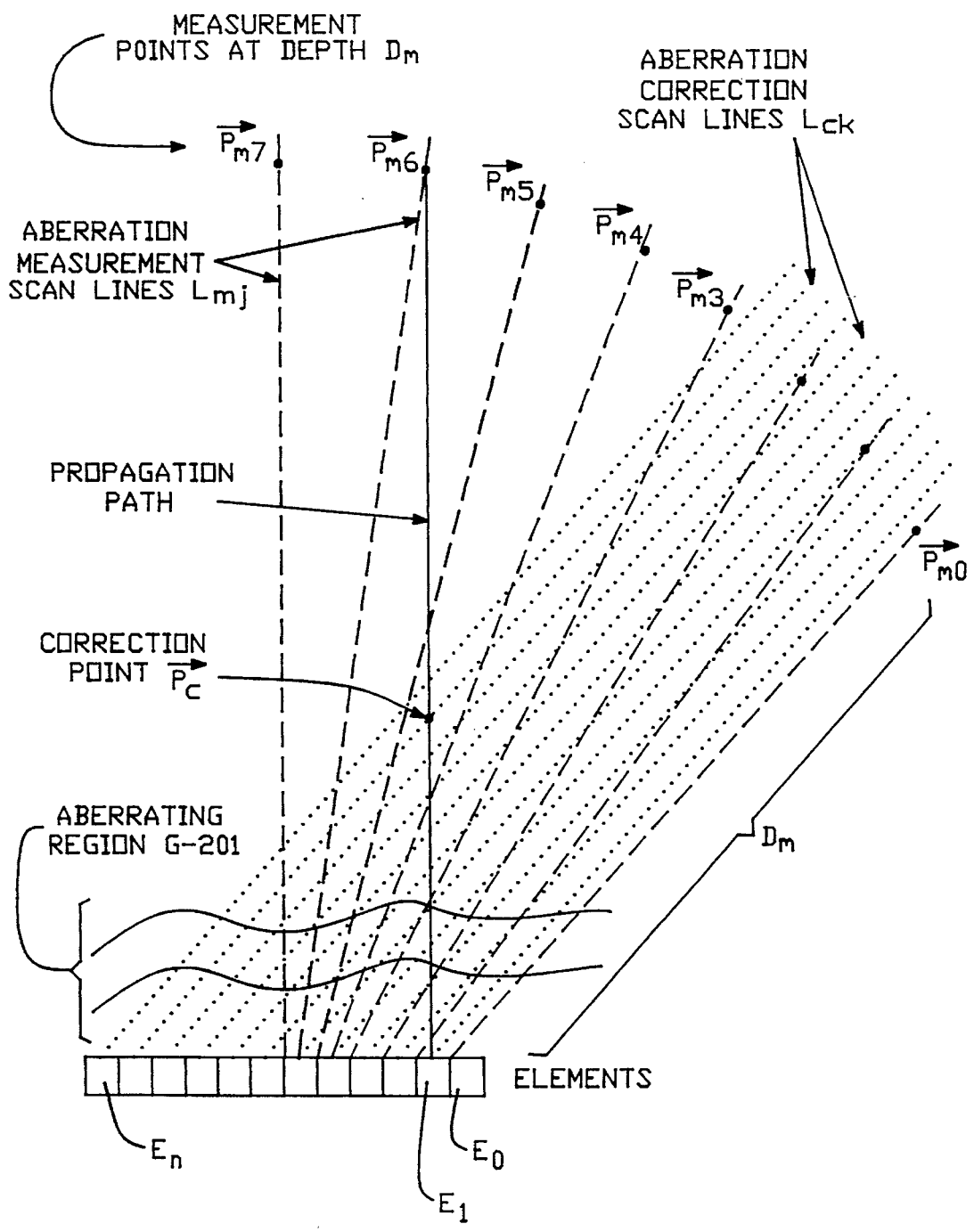
FIG. 8 illustrates use of a GAT™ function in different scan geometries according to the present invention.

For any correction point $\vec{P}_c$, regardless of the scan geometry within which that point is defined, values of the GAT™ index function $G(.)$ can be determined as a geometry problem. This allows aberration corrections measured in one scan geometry to be used to correct the focus in a different scan geometry. FIG. 8 illustrates one such possibility: B-mode measurement scan lines $L_{mj}$ (shown as dashed lines) are generated in a Vector® scan geometry, and aberration measurements are made at points $\vec{P}_{m0}-\vec{P}_{m7}$ located along these scan lines at the measurement depth $D_m$ from the face of the transducer array. Interleaved color Doppler F-mode scan lines $L_{ck}$ (shown as dotted lines) are generated in a steered linear scan geometry, and the resulting color Doppler F-mode image is overlaid onto the B-mode image, with focus corrected using data measured during the B-mode, Vector® scan geometry. To correct the focus for correction point $\vec{P}_c$ (in the steered linear scan geometry format) and element $E_1$ at position $\vec{E}_1$, the measured correction value for point $\vec{P}_{m6}$ (collinear with $\vec{E}_1$ and $\vec{P}_c$) in the Vector® scan geometry format is used. Equation (10) applies to this case, but here $D_c$ and $L_c$ are depth and scan line number in the correction scan geometry (e.g., steered linear), and $D_m$ and the GAT™ index itself are depth and scan line number in the measurement scan geometry (Vector®). The GAT™ index therefore transforms aberration correction values from one scan geometry to another as well as from one depth to another. Note that the form of the GAT™ index (the value associated with a particular element, correction scan line and depth) changes, but the geometric relationship used to determine the GAT™ index for a particular correction point in space remains the same.

The primary approach to the present invention relies on sampled values of a GAT™ index function being stored in a table. Calculation of these index values is a geometric problem that may be solved to arbitrary accuracy by one skilled in the art using numerical methods, and is described further in section V.B.3., Calculating the GAT™ Function. The GAT™ index is calculated for a subset of possible measurement scan lines, called reference scan lines $L_{Rj}$ for element $E_i$ at a correction depth $D_c$ and measurement depth $D_m$, and stored in a table. When correcting the focus for one of these reference scan lines, the GAT™ index value is read directly from the table. When correcting the focus for some scan line $L_c$ other than a reference scan line, the GAT™ index is generated by interpolation. For example, if scan line $L_c$ lies between reference scan lines $L_{R1}$ and $L_{R2}$, the GAT™ index value for scan line $L_c$, $G(E;L_c;D_c;D_m)$, is obtained by interpolation between the GAT™ index values for reference scan lines $L_{R1}$ and $L_{R2}$:

$$G(E;L_c,D_c;D_m) = \alpha_L G(E;L_{R1},D_c;D_m) + (1 - \alpha_L)G(E;L_{R2};D_c;D_m) \quad (12)$$

where $$\alpha_L = \frac{L_{R2} - L_c}{L_{R2} - L_{R1}} \quad (13)$$

This approach has the advantage of separating the generation of values of an ideal GAT index function $G(.)$ from the real-time processing of the GAT index function. However, those skilled in the art could devise other methods to generate values of a GAT™ index function. For example, it could be calculated in real time, using either an exact analytic formula or an approximation, such as a power series expansion.

In the example illustrated in FIG. 6a, propagation paths to correction point $\vec{P}_c$ from each element $E_0$-$E_7$ always pass directly through one of the aberration measurement focal points $\vec{P}_{m0}-\vec{P}_{m14}$. This is usually not the case.

As can be seen from FIG. 7, when generating correction values for element $\vec{E}_5$, measured aberration correction values for measurement points $\vec{P}_{m5}$ and $\vec{P}_{m6}$ may be used respectively as transformed aberration correction values for correction points $\vec{P}_{c5}$ and $\vec{P}_{c6}$. However, when correcting at some correction point $\vec{P}_{c7}$ between $\vec{P}_{c5}$ and $\vec{P}_{c6}$, an aberration correction value for a point $\vec{P}_{m7}$ between $\vec{P}_{m5}$ and $\vec{P}_{m6}$ is required. Because no aberration correction value was measured for this point, the aberration correction value $T_{corr}(\vec{P}_{c7})$ to be applied to correction point $\vec{P}_{c7}$ is determined by taking either the measured correction value $T_{meas}(\vec{P}_{m5})$, measured at point $\vec{P}_{m5}$, or $T_{meas}(\vec{P}_{m6})$ measured at point $\vec{P}_{m6}$, whichever is closer to $\vec{P}_{m7}$.

In another embodiment, the aberration correction value $T_{corr}(\vec{P}_{c7})$ may be calculated by interpolating between $T_{meas}(\vec{P}_{m5})$ and $T_{meas}(\vec{P}_{m6})$:

$$T_{corr}(\vec{P}_{c7})=T_{meas}(\vec{P}_{m7})=\alpha_L T_{meas}(\vec{P}_{m5})+(1-\alpha_L)T_{meas}(\vec{P}_{m6}) \quad (14)$$

where $\alpha_L$ is a weighting based on scan line number, steering angle, or some other scan line dependent parameter. For example, to interpolate in scan line number, $$\alpha_L = \frac{L_{m6} - L_{m7}}{L_{m6} - L_{m5}} \quad (15)$$

where $L_{m5}$, $L_{m6}$ and $L_{m7}$ are the measurement scan lines on which, respectively, $\vec{P}_{m5}$, $\vec{P}_{m6}$ and $\vec{P}_{m7}$ are located.

Figure 9:
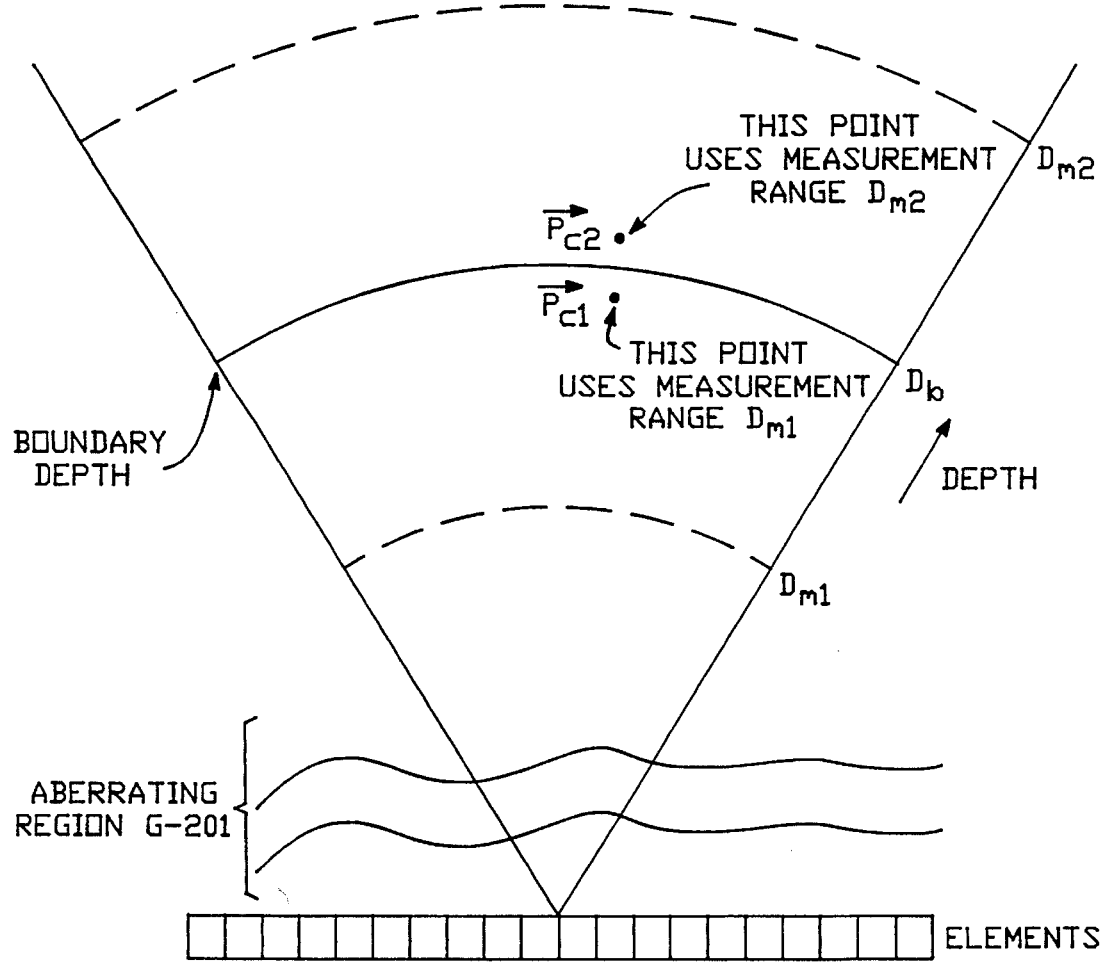
FIG. 9 illustrates use of a GAT™ function in different areas or zones of an imaged subject according to the present invention.

In addition, the above principles may be extended to measurement schemes that obtain measured aberration correction values at several depths, creating zones in an imaged subject as illustrated in FIG. 9. For example, a first zone may be defined as the space between the transducer elements and some boundary depth $D_b$, containing a measurement depth $D_{m1}$. A second zone may be defined deeper than the boundary depth $D_b$, containing a second measurement depth $D_{m2}$.

Two sets of GAT™ indices are then defined, one transforming to measurement range $D_{m1}$ and one transforming to measurement range $D_{m2}$. For all focal points (such as $\vec{P}_{c1}$) within the first zone (shallower than $D_b$), correction is performed using the first GAT™ index set and measurement depth $D_{m1}$, while focal points (such as $\vec{P}_{c2}$) deeper than $D_b$, are corrected using the second GAT™ index set and measurement depth $D_{m2}$.

The discussion above has centered on the use of the invention to extract transformed delay correction values from measured delay aberration values. In alternative embodiments, the invention may be applied usefully to any aberration correction values measured for elements and measurement points, where 1) the underlying values depend only on the straight line path from each element to each correction point through an aberrating medium; 2) the measured values vary smoothly with element number; and 3) the measured values vary smoothly with scan line.

3. Calculating The GAT™ Index Function

Calculating the GAT™ index function is a geometric problem that may be solved by a number of methods. It may be calculated while scanning, calculated when scanning is initiated, or pre-calculated and stored in a large table. For some scan geometries (including, but not limited to linear, steered linear, curved linear, and sector), exact analytic expressions may be used; for others, approximations may be required. For all formats, the GAT™ function can be calculated by one of ordinary skill in the art to arbitrary accuracy by numerical methods, or to less accuracy by more computationally efficient methods.

Figure 10:
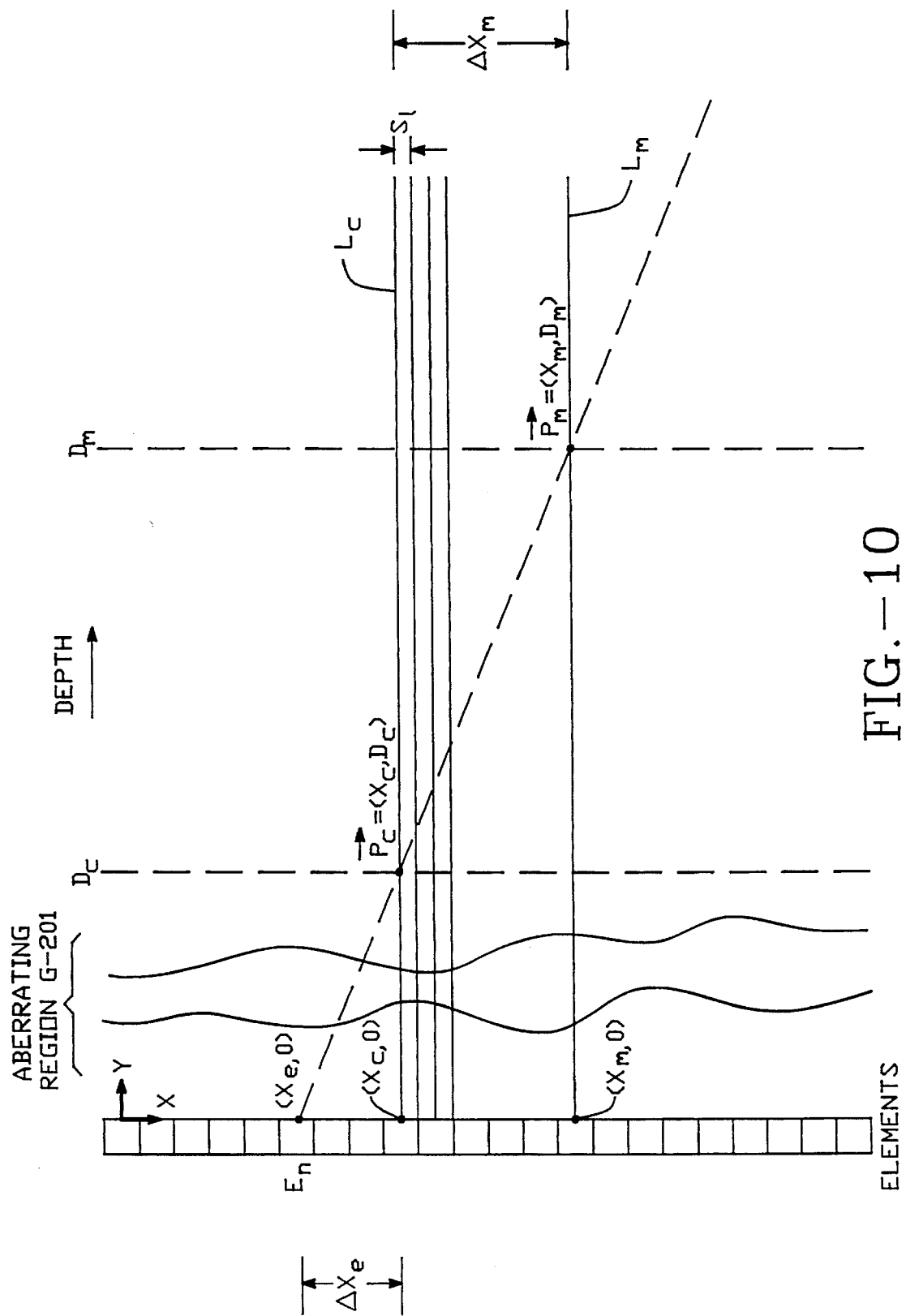
FIG. 10 illustrates an example of calculating a GAT™ function for a linear transducer according to the present invention.

To illustrate the principles of GAT™ index function calculations, FIG. 10 shows an example of the exact calculation of a GAT™ index for a planar transducer operating in a linear scan geometry (which produces equi-spaced parallel scan lines). A correction is desired for element $E_n$ with coordinates $(X_e, 0)$ focused at correction point $\vec{P}_c$ with coordinates $(X_c, D_c)$ on scan line $L_c$. The lateral coordinate $X_m$ of the measurement point $\vec{P}_m$ is given by:

$$X_m = X_e - \frac{D_m}{D_c}(X_e - X_c) \quad (16)$$

This may be rewritten $$\Delta X_m = \left(1 - \frac{D_m}{D_c}\right)\Delta X_e \quad (17)$$

where $\Delta X_m = X_m - X_c$ is the lateral distance from measurement point $\vec{P}_m$ to correction scan line $L_c$ and $\Delta X_e = X_e - X_c$ is the lateral distance from element E to correction scan line $L_c$.

To calculate a usable GAT™ index, all that remains is to translate the lateral coordinate $X_m$ of the measurement into measurement scan line number $L_m$. If the spacing between scan lines is $S_1$ such that $X_m$ and $X_c$ are related to measurement scan line number $L_m$ and correction scan line number $L_c$ $$X_m = L_m \cdot S_1 \quad (18)$$

$$X_c = L_c \cdot S_1 \quad (19)$$

then equation (16) above may be rewritten $$L_m = L_c + \frac{1}{S_l}\left(1 - \frac{D_m}{D_c}\right)(X_e - X_c) \quad (20)$$

Thus equation (20) is the exact GAT™ index function for the scan geometry depicted by FIG. 10.

Figure 11:
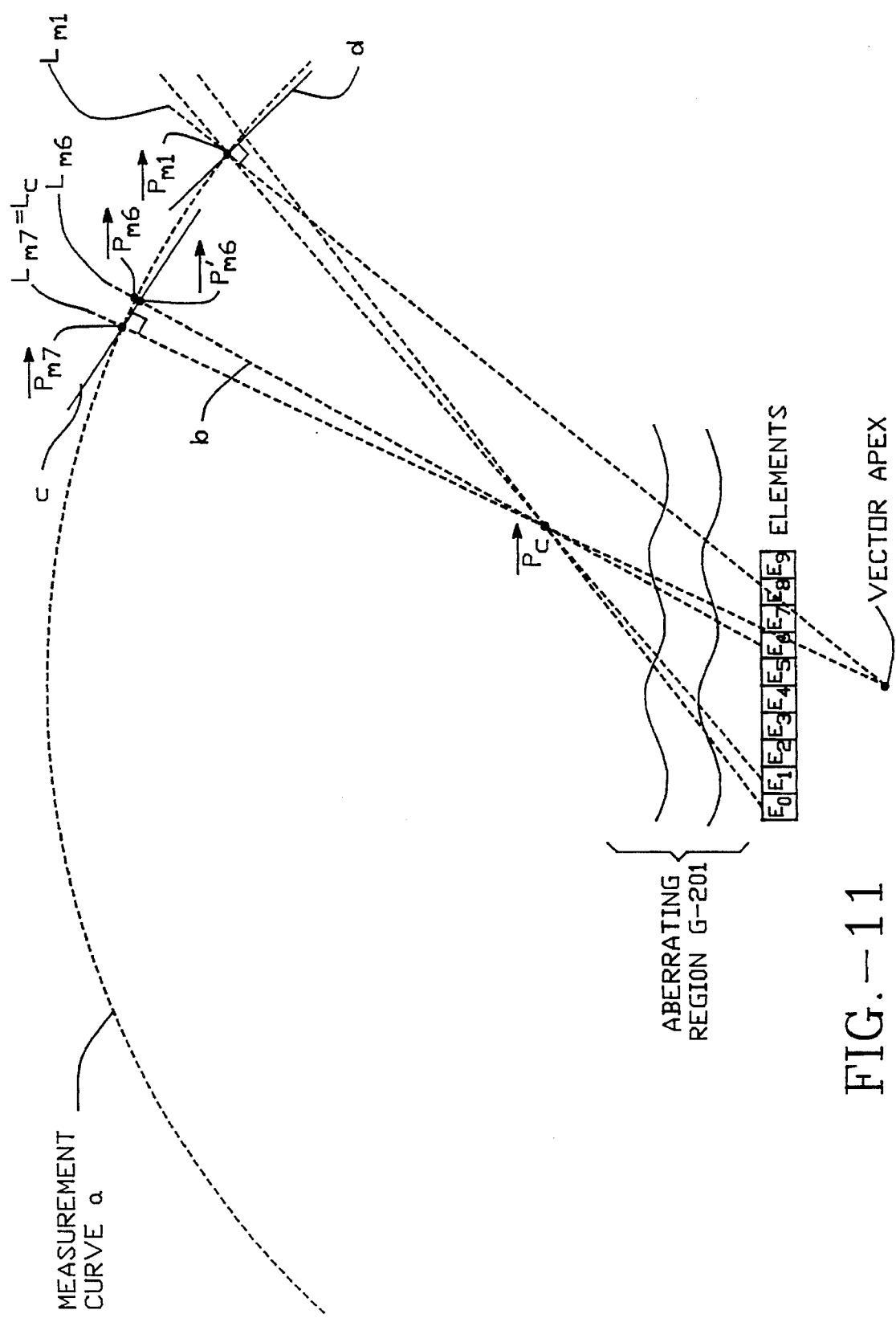
FIG. 11 illustrates an example of calculating a GAT™ function numerically according to the present invention.

FIG. 11 illustrates an alternative example of a way to calculate GAT™ index values by numerical approximation rather than exact analytic evaluation:

1) Start with the element ($E_7$ in the FIG. 11) closest to the origin of the correction scan line $L_c$. For this element, the GAT™ index function will return approximately the correction scan line number.

2) Using this estimate as a starting point, a more accurate estimate of the GAT™ index may be formed as described below. This step may be iterated as necessary, using each new estimate as a basis to make further refinements.

3) Proceeding to an adjacent element $E_6$, this new estimate of the GAT™ index for element $E_7$ is used as a first estimate to calculate the index for element $E_6$. Each subsequent estimate of the GAT™ index is used as a starting point to approximately calculate the index for the next element.

For example, measurement point $\vec{P}_{m7}$ on measurement scan line $L_{m7}$ is used to correct for the aberration at element $E_7$ and current focal point $\vec{P}_c$. To approximate the GAT™ index for element $E_6$ at position $E_6$, scan line $L_{m7}$ is taken as a first estimate. A line c is determined perpendicular to scan line $L_{m7}$ at measurement point $\vec{P}_{m7}$. A line b is determined through element position $\vec{E}_6$ and current focal point $\vec{P}_c$. The intersection $\vec{P}'_{m6}$ of line c and line b approximates the intersection of line b and measurement curve a (the locus of points at which measured aberration correction values are available). Scan line $L_{m6}$ on which $\vec{P}'_{m6}$ lies is determined and used as an estimate for the GAT™ function for element $E_6$. This is expressed as:

$$G(E_6; L_c, D_c; D_m) \approx L_{m6} \quad (21)$$

A new point $\vec{P}_{m6}$, on scan line $L_{m6}$ but exactly at the measurement range $D_m$ (i.e., on measurement curve a), is then determined. This scan line $L_{m6}$ may be used in place of $L_{m7}$ as a new first estimate to further approximate the GAT™ index for element $E_6$, and the step described above may be iterated as necessary to obtain an estimate of the GAT™ index to arbitrary accuracy. When a satisfactory estimate of the GAT™ index for element $E_6$ has been obtained, it is used as a starting point in the subsequent calculation of the GAT™ function for the next adjacent element $E_5$.

4. Special Cases of the GAT™ Function

Figure 12:
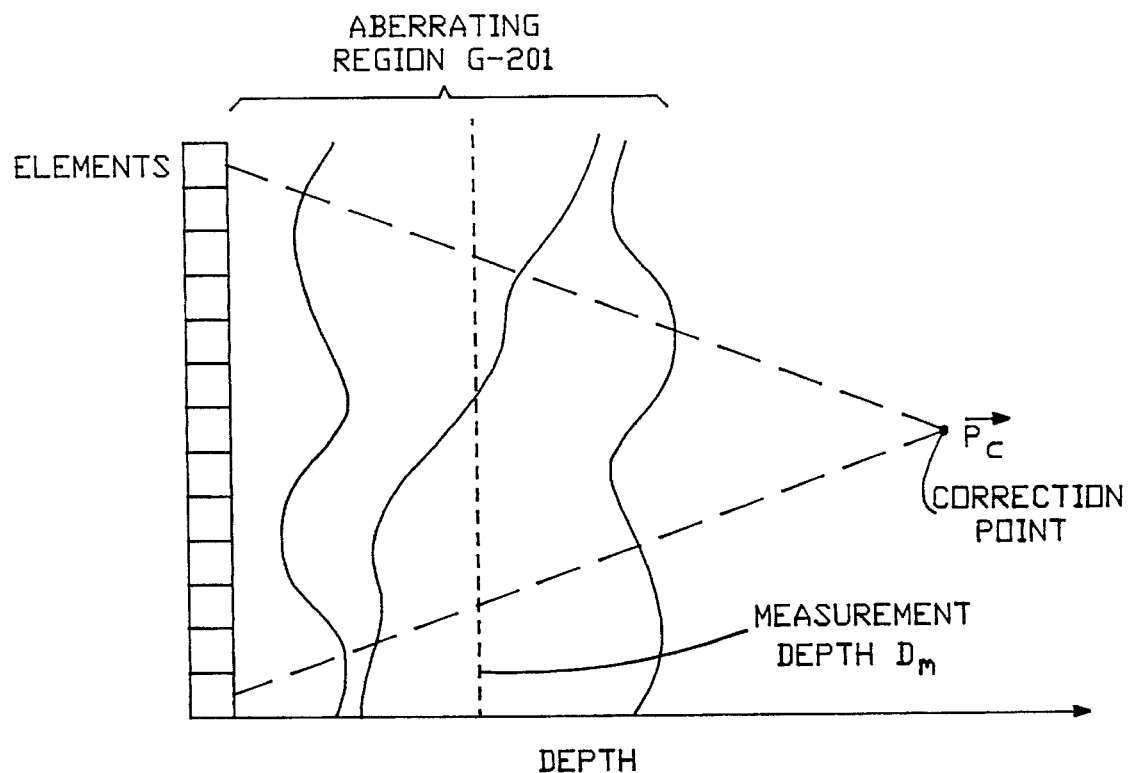
FIG. 12 illustrates a measurement depth within the aberrating region according to the present invention.
Figure 13:
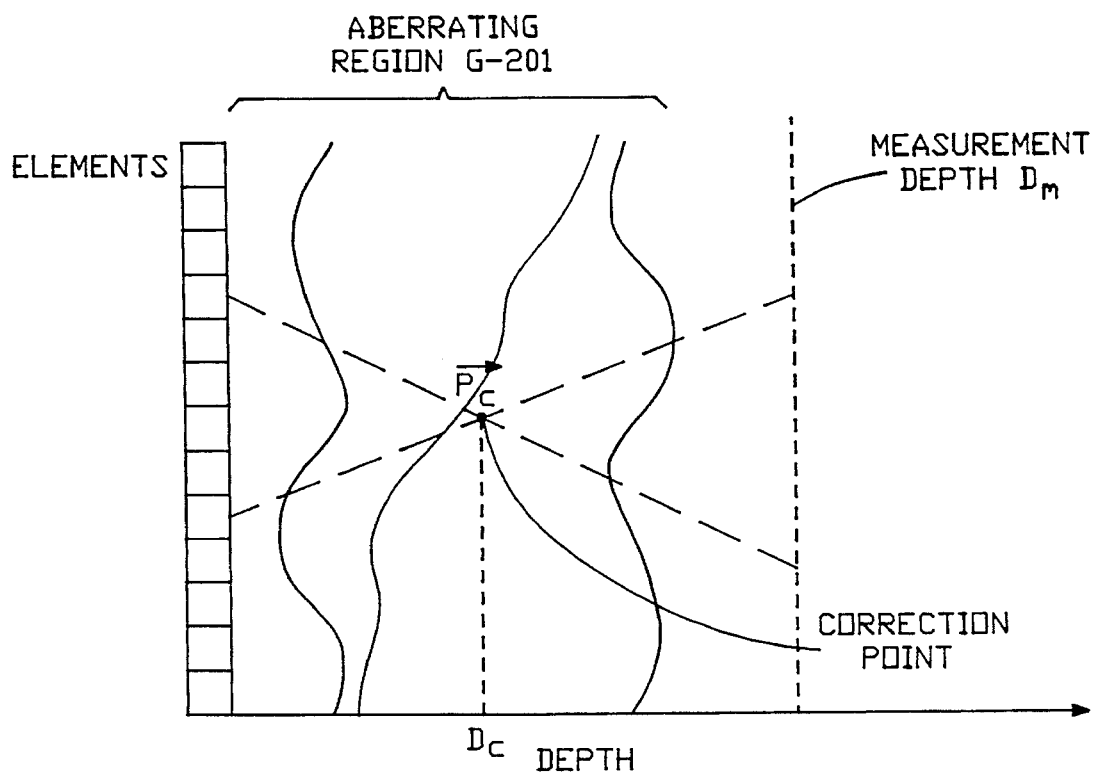
FIG. 13 illustrates a correction point within the aberrating region according to the present invention.

Obtaining aberration correction values using the GAT™ index function involves special cases which must be considered. First, an assumption was made that measurement points $\vec{P}_{mj}$ and correction point $\vec{P}_c$ lie entirely outside aberrating region G-201 in FIG. 6a. When this is not the case, the quality of the correction will suffer. FIGS. 12 and 13 illustrate two such examples. When measurement depth $D_m$ in FIG. 12 lies within the aberrating region G-201, the measured aberration corrections will correct only for the effect of that portion of aberrating region G-201 lying between the elements and measurement depth $D_m$. When correction point $\vec{P}_c$ lies within aberrating region G-201, as in FIG. 13, the situation is more complicated. The focusing error due to that portion of the aberrating region lying between the elements and correction point $\vec{P}_c$ will be accurately corrected. However, the aberration correction value will also include a component due to that portion of aberrating region G-201 lying between correction point $\vec{P}_c$ and measurement depth $D_m$. This region beyond $D_c$ in FIG. 13 should ideally not be included in the aberration correction, and therefore represents a newly introduced residual error term. However, there are two mitigating factors that reduce the impact of this error term. First, for focal points in the deeper half of the aberrating region G-201 (the half of the region furthest from the transducer element in FIG. 13), the residual error described above will be less on average than the original error. Thus, imaging with the correction values should still yield a net improvement over imaging with no correction at all. Second in many medical ultrasound applications, imaging the body wall, the presumed source of most aberrations, is of less interest than soft tissue. Most of the correction points where accurate beam-formation is desired will lie beyond the body wall and, hence, beyond the aberrating region G-201.

A second special case is the sensitivity of correction values generated by the invention to certain inaccuracies in the measurement of aberration correction profiles. Slight differences (such as steering errors, constant delay offsets or phase offsets) in the aberration correction values measured for adjacent scan lines may result in element-to-element delay or phase errors in aberration corrections obtained away from a measurement depth. Even a small variation in steering error, which merely results in mild geometric distortion at a measurement depth, may noticeably degrade beam formation away from the measurement depth. Special care must be taken to ensure that no scan line-to-scan line bias errors are introduced into measured aberration correction values, in order that the GAT™ index function work properly.

However, many aberration measurement schemes cannot measure certain "unobservable" components of each aberration correction profile. These "unobservable" components, such as steering errors, geometrically distort the image without degrading the focus quality of an individual scan line. They correspond roughly in a planar transducer to a constant delay offset plus a linear delay across all elements. The present invention operates best in combination with an adaptive beamforming ultrasound system that does not introduce or attempt to correct for such errors. However, even when such errors exist, the aberration corrections generated by the invention improve the quality of focus better than does a single correction used at all depths.

A third special case occurs when a GAT™ index function G(.) outputs an index value (scan line number) for which aberration correction values are not available. This may occur for a number of reasons. As shown in FIG. 14, near the edge of a transducer or near the edge of the scanned region, there is no measurement focal point collinear with element $E_4$ and the desired focal point $\vec{P}_c$; point $\vec{P}_{mx}$ is collinear with $E_4$ and $\vec{P}_c$ but lies outside the set of measurement scan lines and is thus not a true measurement point. In this case, the GAT™ index function outputs an index value that falls outside the range of measured aberration correction values as illustrated by $\vec{P}_{mx}$ in FIG. 14.

Also, aberration correction values may not be available because measurements were made with a limited portion of the full aperture. In FIG. 15, measurements are made at measurement points $\vec{P}_{m0}$–$\vec{P}_{m26}$ at measurement depth $D_m$ by an eight-element sliding aperture. That is, for each measurement point $\vec{P}_{m0}$ to $\vec{P}_{m26}$, measurements are made at the eight elements closest to that point. Suppose the sliding aperture moves, for example, to elements $E_2$–$E_9$, and an aberration correction value is needed corresponding to element $E_9$ at position $\vec{E}_9$ and focal point $\vec{P}_c$. Measurement point $\vec{P}_{m4}$ is collinear with $\vec{P}_c$ and $E_9$. However, an aberration correction value was not measured for the combination of element $E_9$ and measurement point $\vec{P}_{m4}$, because of the limited aperture. Therefore, the GAT™ index function produces an index value that does not correspond to a valid aberration correction value.

Another reason why aberration correction values may not be available occurs when measurement and correction occur concurrently. There may be a delay (due to processing required or other overhead) between the time a measurement scan line is fired and the time the measured aberration correction values for that line become available for storage and retrieval. The measured aberration correction values for measurement scan lines recently fired may be in the process of being updated, while the same aberration correction values are being indexed by the GAT™ function as a part of the aberration correction value for a current scan line. In some modes and in some implementations, this may not cause problems. However, color Doppler F-mode, for example, requires several firings to obtain a single velocity estimate, and it is important that the aberration correction values used remain constant over this set of firings. In this case, aberration correction values from recently fired scan lines, which may be considered to be in flux, must not be used and are thus unavailable.

Figure 16:
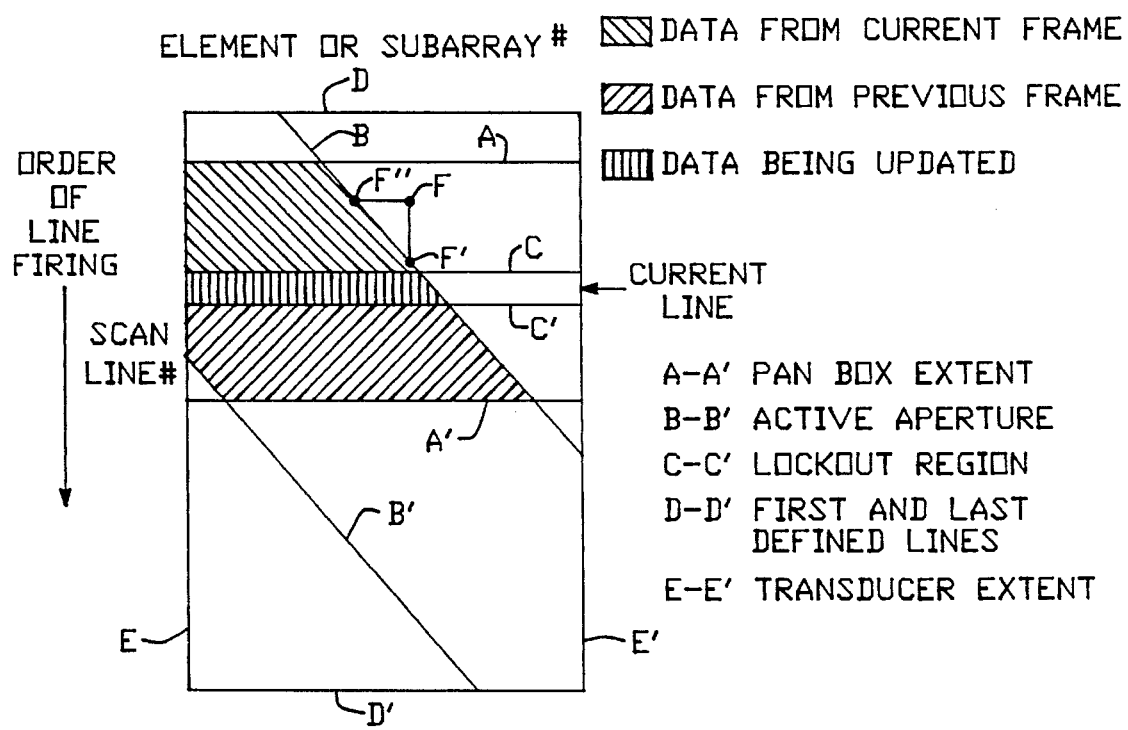
FIG. 16 illustrates updating aberration correction values according to the present invention.
Figure 17:
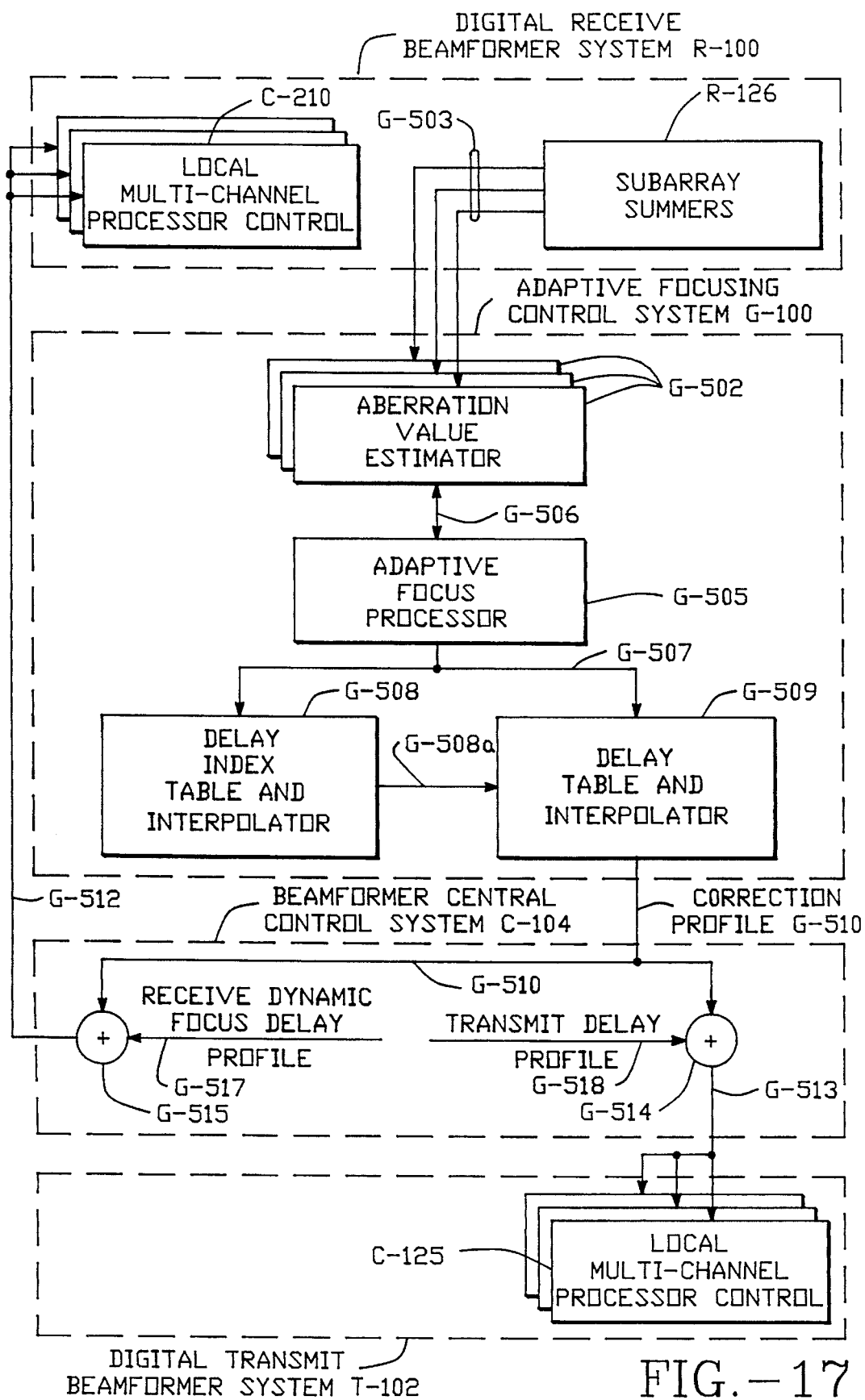
FIG. 17 illustrates the interface of a GAT™ apparatus among an adaptive focusing control system, digital receive beamformer system, beamformer central control system and digital transmit beamformer system according to the present invention.

FIG. 16 illustrates how aberration correction values are updated. FIG. 16 shows the space (the set of elements and measurement scan lines) over which correction values may be measured as a rectangle, defined by a first and last scan line number D and D' and a first and last element number E and E'. Scan line number is on the vertical axis, and may take on any value. The element number is on the horizontal axis. Thus, the two horizontal lines D and D' and two vertical lines E and E' define the boundaries of "scan line"-"element" space. The various lettered lines show boundaries in this space. Lines A and A' mark the first and last defined scan lines of a "pan box," a limited subset of scan lines being generated in each imaging frame. Lines B and B' show the end elements of an active aperture at a measurement depth. Lines C and C' define a "lockout region" about the current scan line in which measured aberration corrections may be in flux or are being updated. The hatched areas of FIG. 16 define elements and scan lines for which correction values have been measured during current and previous frame times. A frame time is considered to be the period of time between transmitting a first scan line in a particular display format and receiving the last scan line in the display format.

When a GAT™ index function selects a scan line number value that, coupled to the element to be corrected, corresponds to point F, in FIG. 16, which is outside the region for which measured aberration correction values exist, several methods can be used to estimate an aberration correction value. In the preferred embodiment, the aberration correction value for the same element and the closest available scan line, (shown as point F') is used. For example, F' as shown in FIG. 16, could correspond to using measurement point $\vec{P}_{m10}$ to correct for $\vec{P}_c$ from element $E_9$ in FIG. 15. Otherwise, the aberration correction for the same scan line and the closest available element (shown as point F"), is used. For example, F" as shown in FIG. 16, could correspond to using measurement point $\vec{P}_{m4}$ from element $E_6$ to correct for $\vec{P}_c$ from element $E_9$ in FIG. 15.

The above approximate corrections, used where measured correction values are not available, are preferable to no correction at all. However, some image degradation, relative to an image formed with perfectly corrected beams, will still occur. Measured correction values for points (element, scan line) far outside the region of available data will be most often requested for focal points at the edges of an image and away from a measurement depth. Therefore, image degradation resulting from incomplete measurements occurs largely at the edges of an image and is usually away from the primary region of interest.

D. Apparatus

This section describes an apparatus for the storage and retrieval of aberration correction values. In the preferred embodiment, corrections are stored for subarrays of four elements. In alternative embodiments, larger or smaller subarrays or even single elements, may be used in place of four element subarrays.

1. Ultrasound Digital Transmit and Receive Beamformer Interfaces to Focusing Control System FIG. 17 illustrates the interface between adaptive focusing control system G-100 and digital receive beamformer system R-100, beamformer central control system C-104 and digital transmit beamformer system T-102 shown in FIG. 2a. Each subarray summer R-126 in baseband multibeam processor R-125 outputs a subarray signal $S_i$ on one of the data paths G-503 to an aberration value estimator G-502 in adaptive focusing control system G-100. Aberration value estimators G-502 are responsible for measuring aberration correction values. These measured aberration values for respective subarrays are then written across data path G-506 to adaptive focus processor G-505. Adaptive focus processor G-505 then completes additional processing of the measured aberration correction values before writing to delay table and interpolator G-509, preferably organized by subarray, scan line, and range. Each transmit or receive beamformation operation initiates delay index table and interpolator G-508, which outputs a scan line index value, preferably generated by the abovedescribed method, on line G-508a to delay table and interpolator G-509. Delay table and interpolator G-509 then outputs a profile of measured or interpolated measurement aberration correction values on line G-510 to beamformer central control system C-104. The receive beamformer aberration correction value profile is then summed, represented by summer G-515, with the receive dynamic focus delay profile on data path G-517, and element delay values from the profile output on data path G-512 to each receiver's local multi-channel processor control C-210 in digital receive beamformer system R-100. The transmit beamformer aberration correction value profile on data path G-510 is summed, through summer G-514, with the transmit focus delay profile on data path G-518, and element delay values from the profile output on data path G-513 to each transmitter's local multi-channel processor control C-125 in digital transmit beamformer system T-102.

2. Adaptive Focusing Control System

Figure 18:
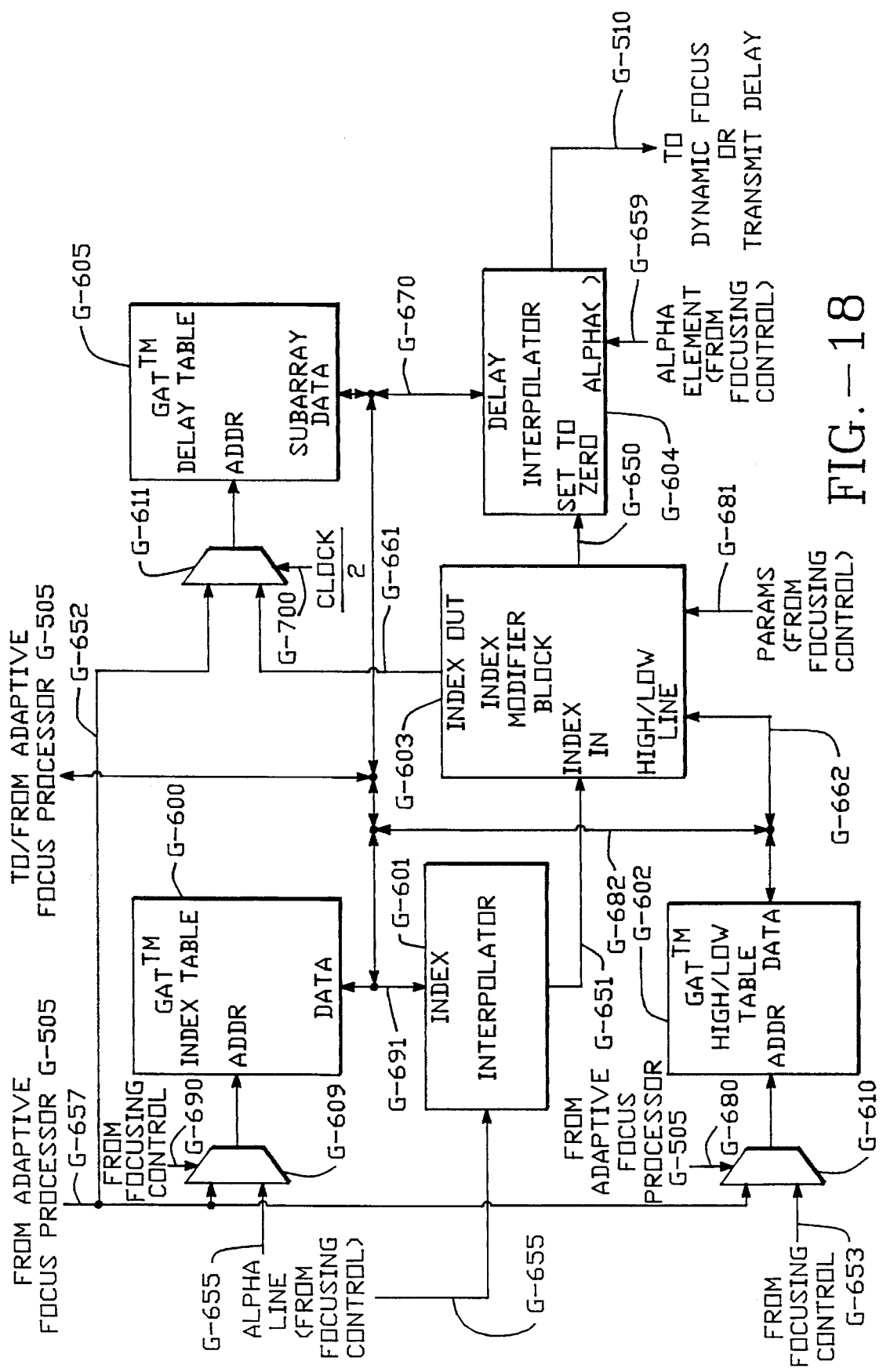
FIG. 18 illustrates a block diagram of a GAT™ apparatus architecture according to the present invention.

FIG. 18 illustrates the implementation of adaptive focusing control system G-100, shown in FIG. 17, according to the present invention. A listing and description of each of the major components is discussed in Sections a–h, with an overall description of the operation provided in Section V.C.3 below.

a. Adaptive Focus Processor

Adaptive focus processor G-505 communicates with many of the components shown in FIG. 18. In particular, adaptive focus processor G-505 controls the flow of information between aberration value estimators G-502 illustrated in FIG. 17 and components in FIG. 18. Adaptive focus processor G-505 transfers data/control information to and from aberration value estimator G-502 over data path G-506. In addition, adaptive focus processor G-505 communicates with GAT™ index table G-600 on control path G-657, GAT™ high/low table G-602 on control path G-657, and GAT™ delay table G-605 on control path G-652. Adaptive focus processor G-505 also communicates directly with aberration value estimators on address and data path G-506.

Adaptive focus processor G-505 is also responsible for knowing which transducer elements are associated with each subarray and thus which subarray results are to be ignored during various modes. For example, adaptive focus processor G-505 should know whether the ultrasound imaging system is in a sliding aperture configuration.

Adaptive focus processor G-505 also initializes the GAT™ index table G-600, GAT™ high/low table G-602 and GAT™ delay table G-605. GAT™ index table G-600 can be initialized by 1) adaptive focus processor G-505 calculating the appropriate GAT™ index values from GAT™ functions; 2) transferring predetermined GAT™ index values from an external memory location, such as read only memory; or 3) a combination of transferring predetermined GAT™ index values and performing additional interpolation.

During scan geometry format changes and transmit focal depth changes, adaptive focus processor G-505 computes or enters the indices into GAT™ index table G-600. During B-mode operation, adaptive focus processor G-505 is involved in real-time computation of measured aberration correction values. Adaptive focus processor G-505 reads the aberration correction values output from the aberration value estimators G-502, processes them, and outputs the results to GAT™ delay table G-605.

In the preferred embodiment, GAT™ delay table G-605 is continuously updated only for B-mode scanning and is also updated during B-mode scan lines of mixed modes, such as B-and-F or B-and-D modes. Non-B-mode scan lines of mixed modes may still retrieve aberration correction values from the GAT™ delay table G-605 in order to correct these non-B-mode scan lines. However, the GAT™ delay table G-605 will only be updated with data from B-mode scan lines. In an alternative embodiment, GAT™ delay table G-605 could be partitioned and updated with correction values acquired during another scanning mode, such as color Doppler F-mode, with these delay correction values kept in a separate partition from that of the B-mode correction values.

b. GAT™ Index Table

FIG. 19 is a detailed illustration of GAT™ index table G-600 shown in FIG. 18.

GAT™ index table G-600 consists of a bit mapping random access memory (RAM). GAT™ index table G-600 is partitioned into sections indexed by a base address $B_n$. Each of these sections contains a GAT™ index for N reference scan lines (where N is a power of 2) and M subarrays, e.g. M=16, 32 or 64. The GAT™ index table G-600 allows a mapping from the current subarray, current scan line, current focal depth, and current scan geometry format to the equivalent measurement scan line number in terms of an aberration value, as seen by the current subarray, when focused at a selected measurement depth.

Address information can be split among three input values: 1) base address, 2) correction scan line number, and 3) subarray number. Base address can be further split into four values: 1) transducer number (separate correction and GAT index for e.g. 2 separate transducers is possible), 2) scan geometry format, 3) correction depth, and 4) measurement depth.

c. GAT™ Index Interpolator

FIG. 18 illustrates an index interpolator G-601 coupled to GAT™ index table G-600 and index modifier block G-603 by data paths G-691 and G-651, respectively. Index interpolator G-601 is responsible for interpolating between index values corresponding to reference lines output from GAT™ index table G-600. A scan line interpolation parameter $\alpha_L$ is supplied from a focusing control C-132 on line G-655 to index interpolator G-601. The scan line interpolation parameter $\alpha_L$ is calculated according to equation (13) by the focusing control C-132 in order to allow index interpolator G-601 to obtain GAT™ index values for the current line by interpolating between GAT™ index values corresponding to a pair of reference scan lines, as shown in equation (12). The interpolated GAT™ index value is then output on data path G-651 to GAT™ index modifier block G-603.

d. GAT™ High/Low Table

FIG. 20 is a detailed illustration of GAT™ high/low table G-602 in FIG. 18. GAT™ high/low table G-602 contains the low scan line and high scan line numbers for all subarrays at a selected measurement depth. The high and low scan line values represent the boundaries of the active aperture in GAT™ delay table G-605. High scan line and low scan line values in GAT™ high/low table G-602 are illustrated by lines B and B' in FIG. 16.

GAT™ high/low table G-602 consists of a bit mapping RAM. GAT™ high/low table G-602 is partitioned into sections by base addresses $B_n$. Finally, high and low scan line values are written by adaptive focus processor G-505 on control path G-682 to GAT™ high/low table G-602. High and low scan line values are addressed by either adaptive focus processor G-505 or focusing control C-132 by way of multiplexer G-610, which is controlled by signals from adaptive focus processor G-505.

e. GAT™ Index Modifier Block

Index modifier block G-603 is responsible for modifying GAT™ index values on data path G-651 based upon inputs from GAT™ high/low table G-602 and parameters from focusing control C-132 on control path G-681. GAT™ index modifier block G-603 will determine whether an index value on data path G-651 falls within the valid index values for the selected imaging format. FIG. 16 illustrates the valid aberration correction values defined by lines A–A' and B–B' for a given set of defined scan lines and transducer elements. As described operationally below, numerous methods may be used to obtain aberration correction values when a requested GAT™ index falls outside of the valid aberration region. If a correct index value cannot be obtained, or the corresponding aberration value is in lockout region C–C' in FIG. 16, a signal may be generated on control path G-650 to set the aberration value output on data path G-670 to zero. Finally, an index value which may have been modified is output on data path G-661 in order to obtain a valid aberration correction value in GAT™ delay table G-605.

f. GAT™ Delay Table

FIG. 21 is a detailed illustration of GAT™ delay table G-605 shown in FIG. 18.

GAT™ delay table G-605 consists of a bit mapping RAM that contains delay data expressed in terms of some nominal period. In the preferred embodiment, the delay is expressed as a signed quantity with resolution of a small fraction of the period. For situations where the frequency changes, such as adjustable frequency or in the presence of downshifting, delay values for all scan lines in GAT™ delay table G-605 will be expressed in terms of the same nominal period. Adjustable frequency is more fully described in the above-referenced and incorporated co-pending patent application entitled: METHOD AND APPARATUS FOR ADJUSTABLE FREQUENCY SCANNING IN ULTRASOUND IMAGING.

GAT™ delay table G-605 is partitioned into sections by base address $B_n$. In each section, delay values are stored for a subarray of transducer elements at a measurement depth.

g. GAT™ Delay Interpolator

Delay interpolator G-604 in FIG. 18 calculates individual transducer element aberration correction delay values from subarray aberration correction delay values output from GAT™ delay table G-605 on data path G-670. GAT™ delay interpolator G-604 uses signals on control path G-650 from index modifier block G-603 and element interpolation parameter $\alpha_E$ on control path G-659 derived from focusing control C-132. Time delays for individual elements are obtained by interpolating between two output subarray aberration correction values $T_A$ and $T_B$ output on data path G-670. For example, subarray aberration correction value $T_A$ corresponds to subarray A consisting of elements $E_0$–$E_3$. Adjacent subarray aberration value $T_B$ corresponds to adjacent subarray B consisting of elements $E_4$–$E_7$. The time delays $T_{E2} \ldots T_{E5}$ for the elements $E_2$, $E_3$, $E_4$, and $E_5$ are determined as follows:

$$T_{Ei} = \alpha_{Ei} T_A + (1 - \alpha_{Ei}) T_B \quad i = 2, \ldots, 5 \qquad (22)$$

where $\alpha_{Ei}$ is the value output on control path 659 from focusing control C-132.

In another embodiment, the delay interpolator G-604 in combination with the index modifier block G-603 (which provides an interpolation parameter) could incorporate the function of interpolating the delay samples in scan line number, calculating aberration correction values for scan lines between those actually measured.

Finally, if index modifier block G-603 determines that an index value for GAT™ delay table G-605 is invalid, a signal will be asserted on control path G-650 to delay interpolator G-604 to set the delay values on data path G-660 to zero.

3. Operational Description of GAT™ Apparatus

The following describes the operation of a GAT™ apparatus, as illustrated in FIG. 18. At the start of scanning in a given scan geometry with some known set of measurement foci, adaptive focus processor G-505 calculates GAT™ index values for each of several reference scan lines. Adaptive focus processor G-505 stores these values in GAT™ index table G-600. Adaptive focus processor G-505 also stores values in GAT™ high/low table G-602 for the selected measurement scan geometry for which measured delay values are available.

Aberration value estimators G-502 in FIG. 17 measure initial estimates of aberration correction values at the selected measurement foci, and transfer these estimates to adaptive focus processor G-505. Adaptive focus processor G-505 loads the estimate into GAT™ delay table G-605.

Alternately, no initial estimates may be made by aberration value estimators G-502. In this case, predetermined aberration correction values will be downloaded from memory within an adaptive ultrasound imaging system to the adaptive focus processor G-505 and then written to GAT™ delay table G-605.

To obtain aberration correction values at a selected depth and current scan line number, index values are read from GAT™ index table G-600 of FIG. 18 for the reference scan lines above and below the selected scan line number for the selected focus depth and for each subarray. All these values are supplied to GAT™ index table through multiplexer G-609 from focusing control C-132 on data path 655. Multiplexer G-609 is controlled by inputs on control path G-690 from focusing control C-132.

GAT™ index interpolator G-601 then interpolates between the two GAT™ index values at the reference scan lines to obtain an index value at the current scan line. As mentioned above, the GAT™ index values (at the reference scan lines) stored in the GAT™ index table G-600 may refer to non-existent scan lines. For example, negative scan line numbers may be output, as illustrated (by $\vec{P}_{mx}$) in FIG. 14. Index interpolator G-601 is able to interpolate between two existing scan line numbers, between an existing and a non-existing scan line number, or between two non-existing scan line numbers and still produce a consistent result.

A GAT™ index value obtained for each subarray is transferred on data path G-651 to index modifier block G-603. At the same time, for each subarray, the high and low scan lines for which an aberration value is available (given a scan geometry format and measurement depth) is read on control path G-662 from GAT™ high/low table G-602 and passed to the index modifier block G-603. At the same time, the first and last scan lines fired in the current frame are passed to the index modifier block G-603 via control path G-681.

The index modifier block G-603 outputs to multiplexer G-611 on data path G-661, the available measurement scan line closest to the requested GAT™ index value. That is, of all the measurement scan lines for which a correction value is known to exist for the selected subarray, the index modifier block selects the scan line closest to the requested GAT™ index value. If a correction value is not known for any scan line number for the selected subarray, the index modifier block G-603 generates a signal on control path G-650. Delay interpolator G-604 will then disable corrections (by outputting zero values) for the selected subarray output from the GAT™ delay table G-605.

In an alternative mode, GAT™ index modifier block G-603 may also override a GAT™ index value output on data path G-651, selecting for all subarrays either 1) the current scan line, 2) the low boundary scan line of the lockout region C–C', or 3) the high boundary scan line of the lockout region C–C'. The low and high boundary scan lines of lockout region C–C' are scan lines immediately outside the lockout region.) These modes may be used at or near the measurement foci. Selecting the current line near the measurement foci essentially disables the GAT™ near the measurement foci so that the GAT™ does not interfere with adaption. Selecting the lowest line outside the lockout region may be used to support adaption, as described in the above-referenced and incorporated patent application entitled: METHOD AND APPARATUS FOR REAL-TIME, CONCURRENT ADAPTIVE FOCUSING IN AN ULTRASOUND BEAMFORMER IMAGING SYSTEM.

In an alternate mode, the index modifier block may exclude scan lines within a lockout region C–C'. When a scan line within lockout region C–C' is selected, the index modifier block may return either 1) the current scan line, 2) the low boundary scan line of lockout region C–C', or 3) the high boundary scan line of lockout region C–C'. Selecting one of the boundary scan lines outside the lockout region may be done, for example, in F-mode, to keep applied aberration correction values from changing during the course of the several ultrasound firings required to obtain one F-mode Doppler-processed scan line.

In an alternate mode, the index modifier block may add an offset to the index output on data path G-651, before carrying out subsequent steps of determining the closest valid scan line number and excluding scan line numbers in the lockout region. For points close to the measurement focus this keeps the returned index out of the lockout region without causing any discontinuity in the applied correction profile (which would result from one subarray using a correction value from one edge of the lockout region and an adjacent subarray element using a correction value from another edge of the lockout region).

The index modifier block may be programmed to simply disable corrections, by generating a signal on control path G-650 to delay interpolator G-604. This may be done, for example, on the first few scan lines or the first frame after a scan geometry format change to prevent correction using invalid data.

In an alternate mode, if the index returned by the above steps differs from the nominal value output on data path G-651 by more than a specified amount, the index modifier block may disable (zero) the corrections sent to the selected subarray. For example, if for some element, scan line number 12 is output on data path G-651, and the first valid scan line returned by the above steps is scan line number 100, then the correction value measured for scan line number 100 may have no correlation to the correction value needed for scan line number 12. In this case, it is better to disable correction than to use invalid correction values.

In alternate modes, GAT™ index modifier block G-603 may take into account the age of correction values. In FIG. 16, the various hatched regions indicate those scan lines and elements or subarrays for which correction values have been measured. Within this region, a further distinction may be made between the ages of the measured aberrations. Because correction values are measured and stored sequentially with each firing, some of the correction values in GAT™ delay table G-605 will have been measured in the current scanning frame and some in the previous frame. In FIG. 16, the order of scan line firing is from top to bottom. Thus, correction values for those scan lines above the current scan line will have been acquired during the current frame, and correction values for those scan lines below the current scan line will have been acquired during the previous frame. Within the shaded region A–C' in FIG. 16, the age of the correction values progresses smoothly, with the oldest estimates at the top and the newest at the bottom. Index modifier block G-603 may, in some modes, disable correction when the index returned by the above steps is older than the current scan line by some specified amount.

An index value determined by the index modifier block G-603 is then output on data path G-661 to multiplexer G-611 in order to address GAT™ delay table G-605. Multiplexer G-611 is controlled by a clock signal which is divided by two on control path G-700. A corresponding subarray aberration correction value is output on data path G-670 to delay interpolator G-604. Delay interpolator G-604 converts two subarray aberration correction values to aberration correction values for individual transducer elements according to equation (22). Finally, the aberration corrections are transferred on data path G-510 to summers G-515 and G-514, illustrated in FIG. 17, where they are used to correct focusing for both transmit and receive ultrasound beamformers.

Accordingly, the GAT™ function may be used to generate delay corrections on both transmit and receive. In other words, aberration correction values may be used to correct focus for an ultrasound firing, and the returned signals from the same ultrasound firing may then be used to measure aberration correction values.

Adaptive focus processor G-505 may also interleave writing newly measured aberration correction values to GAT™ delay table G-605 while reading out values from GAT™ delay table G-605 for correcting focus on subsequent scan lines.

E. Conclusion

An ultrasound system having a GAT™ apparatus and method is disclosed. The GAT™ function allows for aberration correction values measured along scan lines, preferably at a transmit focus depth $D_m$ to be transformed and used for any focal points $\vec{P}_c$ in an imaged subject. The transformation allows for the use of aberration correction values at all points in an image without requiring additional measurements, special scan geometries, or additional frame time.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments where chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method for providing aberration correction values in an ultrasonic imaging system to compensate for propagation aberrations in a medium, said ultrasonic system comprising a plurality of transducer elements organized into a plurality of transducer subarrays, comprising the steps of:

storing a first plurality of aberration correction values, each aberration correction value corresponding to a respective one of a plurality of transducer subarrays and a respective one of a plurality of first locations in said medium; and selecting for a second location in said medium a second plurality of aberration correction values from the first plurality of aberration correction values wherein at least two of the selected aberration correction values correspond to distinct first locations, and wherein said second location is at a distinct depth from the first locations.

2. The method of claim 1, wherein the storing and selecting occur concurrently with imaging.

3. The method of claim 1, wherein the first plurality of aberration correction values are delay values.

4. The method of claim 1, wherein the first plurality of aberration correction values are phase values.

5. The method of claim 1, wherein the first plurality of aberration correction values are amplitude values.

6. The method of claim 1, wherein the aberration correction values are selected from the group consisting of at least two of delay, phase and amplitude values.

7. The method of claim 1, wherein the first plurality of aberration correction values correspond to a first frequency and the second plurality of aberration correction values correspond to a second frequency.

8. The method of claim 1, wherein the second plurality of aberration correction values are delay values.

9. The method of claim 1, wherein the second plurality of aberration correction values are phase values.

10. The method of claim 1, wherein the second plurality of aberration correction values are amplitude values.

11. The method of claim 1, wherein the second plurality of aberration correction values are selected from the group consisting of at least two of delay, phase and amplitude values.

12. The method of claim 1, wherein the aberration correction values are measured aberration correction values.

13. The method of claim 1, wherein the first location is a measurement location.

14. The method of claim 13, wherein the measurement location is at or about a transmit focal point.

15. The method of claim 1, wherein the second location is a selected location.

16. The method of claim 15, wherein the selected location is at or about a receive focal point.

17. The method of claim 1, wherein the selecting step includes generating index values associated with the second plurality of aberration correction values.

18. The method of claim 1, wherein the storing step obtains aberration correction values from at least one imaging scan line.

19. The method of claim 18, wherein the scan lines are selected from the group consisting of a B-mode scan lines and color Doppler mode scan lines.

20. The method of claim 1, wherein the selecting step obtains aberration correction values for at least one scan line.

21. The method of claim 20, wherein the scan lines are selected from the group consisting of B-mode scan lines, color Doppler mode scan lines, D-mode scan lines, and M-mode scan lines.

22. The method of claim 1, wherein at least one of the plurality of transducer subarrays comprises a single transducer element.

23. The method of claim 1, wherein at least one of the plurality of transducer subarrays comprises at least two transducer elements.

24. The method of claim 1, wherein the storing and selecting correspond to a first zone of a plurality of zones.

25. The method of claim 1 wherein the ultrasound imaging system includes an index table coupled to an aberration correction value table storing the first plurality of aberration correction values and the step of selecting is further defined by the steps of:

generating a plurality of index values for the index table, each index value corresponding to a transducer subarray, a scan line number, a correction depth, and a measurement depth;

selecting an index value from the plurality of index values based on a selected transducer subarray, a selected scan line number and a selected correction depth; and retrieving the second plurality of aberration correction values, responsive to a plurality of selected index values, from the aberration correction value table.

26. The method of claim 25, wherein the selecting and retrieving occurs concurrently with imaging.

27. The method of claim 25, wherein the step of selecting an index value is further defined by the step of:

interpolating between a first index value and a second index value.

28. The method of claim 25, wherein the step of retrieving is further defined by the step of:

interpolating between a first aberration correction value and a second aberration correction value.

29. The method of claim 25, wherein the step of retrieving is further defined by the step of:

interpolating between a first aberration correction value and a second aberration correction value to affect finer scan line spacing.

30. The method of claim 25, wherein the step of retrieving is further defined by the step of:

interpolating between a first aberration correction value and a second aberration correction value to affect finer subarray spacing.

31. The method of claims 1, 2, 6, 7, 11, 17, 20, 24, or 25 wherein the selected correction values vary by scan line for at least some scan lines.

32. The method of claims 1, 2, 6, 7, 11, 17, 20, 24, or 25 wherein at least one of the plurality of transducer subarrays comprises four transducer elements.

33. The method of claims 1, 2, 6, 7, 11, 17, 20, 24, or 25 wherein at least four of the selected aberration correction values for a single second location correspond to respective distinct first locations.

34. The method of claim 1 wherein at least one selected correction value corresponds to a first location at or about an extension of a line from the corresponding subarray to the second location.

35. A method for providing aberration correction values in an ultrasonic imaging system having a plurality of transducer subarrays comprising the step of:
    generating a plurality of index values;
    storing said index values in an index table;
    measuring a plurality of aberration correction values;
    storing said plurality of aberration correction values in an aberration correction value table coupled to said index table;
    selecting a plurality of index values from said index table based on a selected transducer subarray and a selected correction location; and
    retrieving a second plurality of aberration correction values, responsive to the plurality of selected index values, from the aberration correction value table.

36. The method of claim 35, wherein the aberration correction values are measured aberration correction values.

37. The method of claim 35, wherein the aberration correction values correspond to at least one imaging scan line.

38. The method of claim 37, wherein the scan lines are selected from the group consisting of B-mode scan lines and color Doppler mode scan lines.

39. The method of claim 35, wherein the selecting step obtains aberration correction values for at least one imaging scan line.

40. The method of claim 39, wherein the scan lines are selected from the group consisting of B-mode scan lines, color Doppler mode scan lines, D-mode scan lines, and M-mode scan lines.

41. The method of claim 35, wherein the step of selecting an index value is further defined by the step of:
    interpolating between a first index value and a second index value.

42. The method of claim 35, wherein the step of retrieving is further defined by the step of:
    interpolating between a first aberration correction value and a second aberration correction value.

43. The method of claim 35, wherein the step of retrieving is further defined by the step of:
    interpolating between a first aberration correction value and a second aberration correction value to affect finer scan line spacing.

44. The method of claim 35, wherein the step of retrieving is further defined by the step of:
    interpolating between a first aberration correction value and a second aberration correction value to affect finer subarray spacing.

45. The method of claim 35, wherein at least one of the transducer subarrays comprises a single transducer element.

46. The method of claim 35, wherein at least one of the transducer subarrays comprises at least two transducer element.

47. The method of claim 35, wherein the step of retrieving a second plurality of measured aberration correction values is further defined by the step of:
    retrieving measured aberration correction values from a subset of the aberration correction values in the aberration correction value table.

48. The method of claim 47, wherein the steps further include the step of:
    modifying the selected index value to correspond to an aberration correction value in the subset of the aberration correction values in the aberration correction value table.

49. The method of claim 35 further wherein the generating step comprises:
    generating the plurality of index values for the index table, each index value corresponding to
        a transducer subarray,
        a correction location, and
        a measurement depth.

50. The method of claims 35 or 49 wherein said plurality of index values corresponds to at least four measurement locations.

51. The method of claims 35 or 49 wherein at least one of the plurality of transducer subarrays comprises four transducer elements.

52. The method of claims 35 or 49 wherein at least four of the retrieved aberration correction values corresponding to index values for a single selected correction location correspond to at least four respective distinct measurement locations.

53. A method for obtaining aberration correction values for a subject having an aberrating region using an ultrasonic imaging system wherein ultrasound signals are transmitted from an ultrasonic array having a plurality of transducer subarrays to a measurement depth in the subject and reflected therefrom, the method comprising the steps of:
    measuring a first set of aberration correction values in a first scan geometry format based on the reflected ultrasonic signals, wherein each aberration correction value corresponds to one of the plurality of transducer subarrays and a measurement location; and
    using the first set of aberration correction values to form a second set of aberration correction values in a second scan geometry format different from the first scan geometry format.

54. The method of claim 53, wherein the reflected signals are used for both measuring aberration correction values and imaging.

55. The method of claim 53, wherein the measuring, storing and mapping occur concurrently with imaging.

56. The method of claim 53, wherein at least one of the transducer subarrays comprises a single transducer element.

57. The method of claim 53, wherein at least one of the transducer subarrays comprises at least two transducer elements.

58. The method of claim 53 wherein the first set of aberration correction values are measured at a plurality of measurement depths.

59. The method of claim 53, wherein the storing step obtains aberration correction values from at least one imaging scan line.

60. The method of claim 59, wherein the scan lines are selected from the group consisting of a B-mode scan lines and color Doppler mode scan lines.

61. The method of claim 53, wherein the mapping step obtains aberration correction values for at least one imaging scan line.

62. The method of claim 61, wherein the scan lines are selected from the group consisting of B-mode scan lines, color Doppler mode scan lines, D-mode scan lines, and M-mode scan lines.

63. The method of claims 53, 54, or 58 wherein at least four aberration correction values in said second set for a single correction values in said second set for a single correction location correspond to at least four respective distinct measurement locations.

64. An ultrasonic imaging system having a transmitter transmitting ultrasonic signals from an array of transducer elements grouped into subarrays and a receiver receiving reflected signals, comprising:

means, coupled to the receiver, for measuring aberration correction values based upon reflected signals received from measurement locations in a subject; and means, coupled to the measuring means, for geometrically transforming the aberration correction values at measurement locations to aberration correction values at selected locations, wherein at least a first one of said selected locations is different than the measurement locations, wherein at least two of the geometrically transformed aberration correction values at said first selected locations correspond to distinct measurement locations, and wherein said first selected location is at a distinct depth from the measurement locations.

65. The apparatus of claim 64, wherein the means for measuring and means for transforming occur concurrently with imaging.

66. The apparatus of claim 64, wherein the means for measuring is operating in a mode selected from the group consisting of B-mode and color Doppler mode.

67. The apparatus of claim 64, wherein the means for transforming is operating in a mode selected from the group consisting of B-mode, color Doppler mode, M-mode or D-mode.

68. The apparatus of claim 64, wherein the means for measuring obtains aberration correction values from at least one imaging scan line.

69. The apparatus of claim 64, wherein the means for transforming obtains aberration correction values for at least one scan line.

70. The apparatus of claim 64, wherein the means for transforming includes:

an index table having a plurality of index values, each index value corresponding to a transducer subarray, a measurement depth, a correction depth, and a scan line number, outputting an index value responsive to a selected transducer subarray, a selected correction depth and a selected scan line number;

an aberration correction value table, coupled to the index table, having a plurality of aberration correction values, each aberration correction value corresponding to a transducer subarray, a measurement depth and a scan line number, outputting an aberration correction value responsive to the index value; and a processor, coupled to the index table, selecting the selected transducer subarray, the selected correction depth and selected scan line number.

71. The apparatus of claim 70, further comprising:

means, coupled to the index table, for interpolating between a first index value and a second index value.

72. The apparatus of claim 70, further comprising:

means for interpolating between a first aberration correction value and a second aberration correction value to affect finer scan line spacing.

73. The apparatus of claim 70, further comprising:

means for interpolating between a first aberration correction value and a second aberration correction value to affect finer subarray spacing.

74. The apparatus of claim 70, further comprising:

means, coupled to an aberration correction value table, for interpolating between a first aberration correction value and a second aberration correction value.

75. The system of claims 64, 68, or 70 wherein at least one of the plurality of transducer subarrays comprises four transducer elements.

76. The system of claims 64, 68, or 70 wherein at least four of the transformed aberration correction values for a single selected location correspond to at least four respective distinct measurement locations.

77. An improved apparatus for use in an ultrasonic imaging system that includes an ultrasonic array of transducer elements;

a transmit beamformer, coupled to the ultrasonic array; and a receive beamformer, coupled to the ultrasonic array;

the improved apparatus comprising:

means for summing signals from the plurality of transducer elements to form a plurality of subarray signals;

means, coupled to the receive beamformer, for measuring a first plurality of aberration correction values based on the plurality of subarray signals and a measurement location; and means, coupled to the measuring means, for transforming the first plurality of aberration correction values to a second plurality of aberration correction values for selected correction locations, said selected correction locations being different than the measurement locations, and wherein at least two of the selected aberration correction values selected for a given correction location correspond to distinct measurement locations.

78. The apparatus of claim 77, wherein the transmit beamformer transmitting, receive beamformer receiving, means for measuring, and means for transforming are during an imaging scanning mode.

79. The apparatus of claim 77, wherein the received ultrasound beam is used both for measuring aberration correction values and imaging.

80. The apparatus of claim 77, wherein the means for measuring and means for transforming occur concurrently with imaging.

81. The apparatus of claim 77, wherein the means for measuring obtains aberration correction values from at least one imaging scan line.

82. The apparatus of claim 81, wherein the imaging scan lines are selected from the group consisting of B-mode scan lines and color Doppler mode scan lines.

83. The apparatus of claim 77, wherein the means for transforming obtains aberration correction values for at least one scan line.

84. The apparatus of claim 83, wherein the scan lines are selected from the group consisting of B-mode scan lines, color Doppler mode scan lines, D-mode scan lines, and M-mode scan lines.

85. The apparatus of claim 77, wherein the means for transforming includes:

an index table having a plurality of index values, each index value corresponding to a transducer subarray, a measurement depth, a correction depth, and a scan line number, outputting an index value responsive to a selected transducer subarray, a selected correction depth, and a selected scan line number;

an aberration correction value table, coupled to the index table, having a plurality of aberration correction values, each aberration correction value corresponding to a measurement depth, scan line number, transducer subarray, outputting an aberration correction value responsive to the index value; and a processor, coupled to the index table, selecting the selected transducer subarray, a selected correction depth, and a selected scan line number.

86. The apparatus of claim 85, further comprising:

means, coupled to the index table, for interpolating between a first index value and a second index value.

87. The apparatus of claim 85, further comprising:

means for interpolating between a first aberration correction value and a second aberration correction value to affect finer scan line spacing.

88. The apparatus of claim 85, further comprising:

means for interpolating between a first aberration correction value and a second aberration correction value to affect finer subarray spacing.

89. The apparatus of claim 85, further comprising:

means, coupled to an aberration correction value table, for interpolating between a first aberration correction value and a second aberration correction value.

90. The apparatus of claim 85, wherein the means for transforming further includes:

means, coupled to the index table and aberration correction value table, for modifying the index values to correspond to aberration correction values in a subset of the aberration correction value in the aberration correction value table.

91. The apparatus of claim 77 wherein said first plurality of aberration correction values for a single correction location correspond to at least four distinct measurement locations.

92. The apparatus of claim 77 wherein at least four of the selected aberration correction values for a correction location correspond to at least four respective distinct measurement locations.

93. The apparatus of claim 77 wherein signals from four transducer elements are summed to form at least one of the subarray signals.

94. The invention of claims 18, 20, 37, 39, 59, 61, 68, 69, 81, or 83 wherein the scan lines are from a scan geometry format selected from a group consisting of Vector® and curved Vector®.

95. The invention of claims 18, 20, 37, 39, 59, 61, 68, 69, 81, or 83 wherein the scan lines are from a scan geometry format selected from a group consisting of sector, linear, curved linear, steered linear, and steered curved linear.

* * * * *

UNITED STATES PATENT AND TRADEMARK OFFICE
CERTIFICATE OF CORRECTION

PATENT NO. : 5,551,433
DATED : September 3, 1996
INVENTOR(S) : J. Nelson Wright et al.

It is certified that error appears in the above-identified patent and that said Letters Patent is hereby corrected as shown below:

TITLE PAGE:

In page 2, column 1, line 4, under "U.S. PATENT DOCUMENTS" replace "5,338,461" with --5,388,461--.

In page 2, column 2, line 3, under "U.S. PATENT DOCUMENTS" replace "5,357,797" with --5,353,797-- and same line 3, replace "10/1994" with --11/1994--.

In column 16, line 34, replace "(.)" with --(·)--.

In column 16 line 36, immediately after "$D_m)$" insert --, $D_m)$.--.

In column 16, line 40, replace "(.)" with --(·)--.

In column 17, line 26, replace "(.)" with --(·)--.

In column 18, line 15, replace "(.)" with --(·)--.

In column 21, line 47, replace "(.)" with --(·)--.

In column 22, line 4, replace "$E_9$" with --$\vec{E_9}$--.

In column 22, line 63, replace "$E_6$" with --$\vec{E_6}$--.

In column 22, line 65, replace "$E_9$" with --$\vec{E_9}$--.

UNITED STATES PATENT AND TRADEMARK OFFICE
CERTIFICATE OF CORRECTION

PATENT NO. : 5,551,433
DATED : September 3, 1996
INVENTOR(S) : J. Nelson Wright et al.

It is certified that error appears in the above-identified patent and that said Letters Patent is hereby corrected as shown below:

In the Claims

In Claim 35, line 3, replace "step" with --steps--.

In claim 46, line 3, immediately after "ment" insert --s--.

In claim 63, lines 3-4 delete "values in said second set for a single correction".

Signed and Sealed this

Twelfth Day of May, 1998

Attest:

BRUCE LEHMAN

*Attesting Officer*     *Commissioner of Patents and Trademarks*